US012674017B2

(12) United States Patent
Noda et al.

(10) Patent No.: US 12,674,017 B2
(45) Date of Patent: Jul. 7, 2026

(54) FIBERS, FIBER MULTILAYER STRUCTURE, SPINNING SOLUTION FOR ELECTROSPINNING, AND METHOD FOR PRODUCING FIBERS

(71) Applicants: SHIN-ETSU CHEMICAL CO., LTD., Tokyo (JP); DAINICHISEIKA COLOR & CHEMICALS MFG. CO., LTD., Tokyo (JP); SHINSHU UNIVERSITY, Matsumoto City (JP)

(72) Inventors: Daisuke Noda, Annaka (JP); Shinji Irifune, Annaka (JP); Masaki Tanaka, Tokyo (JP); Hiromasa Sato, Tokyo (JP); Motoaki Umezu, Tokyo (JP); Toshihisa Tanaka, Ueda City (JP); Keishiro Ono, Ueda City (JP); Kaisuke Nishibu, Ueda City (JP)

(73) Assignees: SHIN-ETSU CHEMICAL CO., LTD., Tokyo (JP); DAINICHISEIKA COLOR & CHEMICALS MFG. CO., LTD., Tokyo (JP); SHINSHU UNIVERSITY, Matsumoto City (JP)

( * ) Notice: Subject to any disclaimer, the term of this patent is extended or adjusted under 35 U.S.C. 154(b) by 853 days.

(21) Appl. No.: 17/775,155

(22) PCT Filed: Nov. 6, 2020

(86) PCT No.: PCT/JP2020/041438

§ 371 (c)(1),
(2) Date: May 6, 2022

(87) PCT Pub. No.: WO2021/090904

PCT Pub. Date: May 14, 2021

(65) Prior Publication Data

US 2022/0403097 A1 Dec. 22, 2022

(30) Foreign Application Priority Data

Nov. 7, 2019 (JP) ................................ 2019-202562

(51) Int. Cl.
*C08G 18/77* (2006.01)
*C08G 18/61* (2006.01)
(Continued)

(52) U.S. Cl.
CPC ........... *C08G 18/778* (2013.01); *C08G 18/61* (2013.01); *D01D 5/0038* (2013.01); *D01F 6/70* (2013.01);
(Continued)

(58) Field of Classification Search
CPC .. D04H 1/4358; D04H 1/728; D10B 2331/10; D01F 6/70; C08G 18/348; C08G 18/61
See application file for complete search history.

(56) References Cited

U.S. PATENT DOCUMENTS

2008/0261043 A1 10/2008 Greiner et al.
2010/0013126 A1 1/2010 Ishaque et al.
(Continued)

FOREIGN PATENT DOCUMENTS

CN 107587268 A 1/2018
CN 108690181 A 10/2018
(Continued)

OTHER PUBLICATIONS

Partial machine translation of JP-2002128852-A (Year: 2012).*
(Continued)

*Primary Examiner* — Kregg T Brooks
(74) *Attorney, Agent, or Firm* — Birch, Stewart, Kolasch & Birch, LLP

(57) ABSTRACT

The present invention provides nanometer-sized fibers that are produced by an electrospinning method with use of a
(Continued)

spinning solution for electrospinning, said spinning solution being environmentally friendly and taking the effects of an organic solvent on the human body into consideration. The fibers are formed from a resin that contains a silicone-modified polyurethane resin which is a reaction product of (A) a polyol, (B) a water dispersant, (C) an active hydrogen group-containing organopolysiloxane represented by formula (1)

$$R^1R^2R^3SiO(SiR^2R^3O)_nSiR^1R^2R^3 \quad (1)$$

(wherein $R^1$ represents a monovalent hydrocarbon group which may have an oxygen atom in the chain, while having from 1 to 10 carbon atoms and a hydroxyl group or a mercapto group, or a monovalent hydrocarbon group which has a primary amino group or a secondary amino group, while having from 1 to 10 carbon atoms; each of $R^2$ and $R^3$ represents a group that is selected from among an alkyl group having from 1 to 10 carbon atoms, an aralkyl group having from 7 to 10 carbon atoms, an aryl group having from 6 to 12 carbon atoms and a vinyl group; and n represents an integer from 1 to 200), and (D) a polyisocyanate.

13 Claims, 10 Drawing Sheets

(51) Int. Cl.
*D01D 5/00* (2006.01)
*D01F 6/70* (2006.01)
*D04H 1/4358* (2012.01)
*D04H 1/728* (2012.01)

(52) U.S. Cl.
CPC .......... *D04H 1/4358* (2013.01); *D04H 1/728* (2013.01); *D10B 2331/10* (2013.01)

(56) References Cited

U.S. PATENT DOCUMENTS

2013/0165618 A1* 6/2013 Brust ................ C08G 18/0823
528/26
2018/0086874 A1 3/2018 Hattori et al.
2019/0071534 A1 3/2019 Hattori et al.
2019/0301056 A1 10/2019 Pardini

FOREIGN PATENT DOCUMENTS

| | | | |
|---|---|---|---|
| JP | 2002128852 | A * | 5/2002 |
| JP | 2007-303031 | A | 11/2007 |
| JP | 2008-531860 | A | 8/2008 |
| JP | 2008-223186 | A | 9/2008 |
| JP | 2010-501738 | A | 1/2010 |
| JP | 2010-189771 | A | 9/2010 |
| JP | 2010-248665 | A | 11/2010 |
| JP | 2012-12715 | A | 1/2012 |
| JP | 2014-47440 | A | 3/2014 |
| JP | 2014-177728 | A | 9/2014 |
| JP | 2019-523351 | A | 8/2019 |
| WO | WO 2016/158967 | A1 | 10/2016 |
| WO | WO 2017/175680 | A1 | 10/2017 |

OTHER PUBLICATIONS

Partial machine translation of CN 107587268 A (Year: 2018).*
"Application to nanofibers of silicone-modified polyurethane", Material Stage, 2016, vol. 16, No. 7, pp. 57-65.
International Search Report for PCT/JP2020/041438 mailed on Jan. 19, 2021.
Written Opinion of the International Searching Authority for PCT/JP2020/041438 (PCT/ISA/237) mailed on Jan. 19, 2021.
Chinese Office Action and Search Report for Chinese Application No. 202080077167.1, dated Sep. 14, 2023, with English translation.
Office Action issued Oct. 28, 2024, in Chinese Patent Application No. 20208077167.1.
Zhang, Y. (2014). The preparation of WPU composite fiber membrane by Electrospinning and its air filtration performance research [Thesis for Master's Degree]. XI' An University of Science and Technology (with English abstract).

* cited by examiner

FIBERS, FIBER MULTILAYER STRUCTURE, SPINNING SOLUTION FOR ELECTROSPINNING, AND METHOD FOR PRODUCING FIBERS

TECHNICAL FIELD

The present invention relates to a fiber including a silicone-modified polyurethane resin, a fiber multilayer structure, a spinning solution for electrospinning, and a method for producing a fiber.

BACKGROUND ART

Typically, the resin fiber is obtained mainly by a dry spinning method, and depending on the type, a melt spinning method or a wet spinning method. The known methods for producing fibers having small fiber diameters and fiber multilayer structures include electrospinning methods (electrostatic spinning method, electrospinning method, and melt electrospinning method).

The electrospinning method is known as a method of discharging a solution containing a polymer or a melt obtained by melting a polymer under a high voltage not only to provide ultrafine polymer by electrostatic repulsive force, but also to form an ultrafine fiber by volatilization or cooling of a solvent, and is a spinning method of collecting the formed ultrafine fiber of the polymer to provide an ultrafine fiber, a fiber multilayer structure, and a nonwoven fabric in one step. Typically, the fiber multilayer structure is cured and formed by evaporation of a solvent from a polymer solution during a spinning step. The curing is also performed by cooling (for example, in the case where the sample is liquid at a high temperature), chemical curing (for example, treatment with curing steam), or evaporation of a solvent (for example, in the case where the sample is liquid at room temperature). In addition, the produced nonwoven fabric can be collected on an appropriately arranged collecting substrate, and can be peeled off as necessary.

In addition, a nano-sized fiber having a fiber diameter of less than 1,000 nm is known to have a super specific surface area effect or a nano-size effect as compared with a normal fiber, and is actively researched and developed as a nanofiber. Particularly, the electrospinning method is widely used because of easily forming a nanofiber.

It has been reported that a fiber and a fiber multilayer structure with a polyurethane resin modified with silicone have characteristics excellent in flexibility, slippage, blocking resistance, heat retention, water vapor permeability, water repellency, and spinnability, as compared with a polyurethane resin fiber and a nanofiber composed of a silicone resin (for example, WO 2016/158967 (Patent Document 1) and WO 2017/175680 (Patent Document 2)).

Whereas, in spinning by the electrospinning method, an organic solvent is generally used; however, the risk of the organic solvent to the human body and the environmental load are problems, and spinning is performed under a high voltage, thus which may cause explosion and fire, and therefore water-based spinning is considered to be preferable.

An example of using an aqueous dispersion, a colloidal liquid, or an emulsion has been reported as spinning of a polymer insoluble in water by the electrospinning method, (for example, JP-A 2008-531860, JP-A 2010-501738, and JP-A 2012-012715 (Patent Documents 3 to 5)). These are subjected to fiber formation and nanofiber production by adding a water-soluble polymer, and a polyurethane resin is also described as an example of the resin; however, resins that have been actually investigated as examples are an acrylic resin, a fluororesin, and a polystyrene resin, and there has been no investigation example of a silicone-modified polyurethane resin.

An aqueous dispersion with forced-emulsified or self-emulsified with an emulsifier is generally used as the aqueous polyurethane resin. JP-A 2010-248665 (Patent Document 6) has reported that a nanofiber laminate can be obtained by including a water-soluble polymer in a polyurethane resin emulsion in an electrospinning method. However, generally commercially available polyurethane resins have a problem of spinnability.

PRIOR ART DOCUMENTS

Patent Documents

Patent Document 1: WO 2016/158967
Patent Document 2: WO 2017/175680
Patent Document 3: JP-A 2008-531860
Patent Document 4: JP-A 2010-501738
Patent Document 5: JP-A 2012-012715
Patent Document 6: JP-A 2010-248665

SUMMARY OF INVENTION

Technical Problem

The present invention has been performed in view of the above circumstances, and an object thereof is to provide a fiber including a silicone-modified polyurethane resin, a fiber multilayer structure, a spinning solution for electrospinning in consideration of the influence of an organic solvent on the human body and the environment, and a method for producing a nano-sized fiber by an electrospinning method with the spinning solution.

Solution to Problem

As a result of investigating spinning by the electrospinning method for the aqueous dispersion of the silicone-modified polyurethane resin described in Patent Document 1, the present inventors have found that a fiber and a fiber multilayer structure are hardly obtained with the aqueous dispersion singly. Therefore, as a result of intensive investigations to solve the above problem, it has been found that the fiber and the fiber multilayer structure of the resin can be obtained by adding a fiber-forming agent in the aqueous dispersion, and further fiber strength and water repellency can be improved by adding a crosslinking agent, and thus the above problem has been solved to complete the present invention.

That is, the present invention provides a fiber, a fiber multilayer structure, a spinning solution for electrospinning, and a method for producing the fiber, as follows.

1.

A fiber formed from a resin including a silicone-modified polyurethane resin that is a reaction product of a polyol (A), a water dispersant (B), an active hydrogen group-containing organopolysiloxane (C) represented by the following formula (1), and a polyisocyanate (D), $$R^1R^2R^3SiO(SiR^2R^3O)_nSiR^1R^2R^3 \quad (1)$$

wherein $R^1$ is independently a $C_{1-10}$ monovalent hydrocarbon group having a hydroxyl group or a mercapto group, and optionally having an oxygen atom interposed in the chain, or $C_{1-10}$ monovalent hydrocarbon group having a primary amino group or a secondary amino group, $R^2$ and $R^3$ are each independently a group selected from a linear, branched or cyclic $C_{1-10}$ alkyl group or $C_{7-10}$ aralkyl group in which a part of hydrogen atoms may be substituted with a fluorine atom, a $C_{6-12}$ aryl group optionally having a substituent, and a vinyl group, and n is an integer of 1 to 200.

2.

The fiber according to 1, wherein an average fiber diameter of the fiber is less than 2,000 nm.

3.

The fiber according to 1 or 2, wherein the component (B) is a compound having at least one active hydrogen group and at least one hydrophilic group in a molecule.

4.

The fiber according to 3, wherein the hydrophilic group of the compound of the component (B) is a carboxy group, sulfonic acid group, or phosphoric acid group.

5.

The fiber according to any one of 1 to 4, wherein the component (B) is a compound having at least one hydroxyl group and at least one carboxy group.

6.

The fiber according to any one of 1 to 5, wherein in the formula (1), $R^1$ is 2-hydroxyetha-1-yl group, 3-hydroxypropa-1-yl group, 3-(2-hydroxyethoxy)propa-1-yl group, or 3-aminopropa-1-yl group, and $R^2$ and $R^3$ are each methyl group, phenyl group, 3,3,3-trifluoropropyl group, or vinyl group.

7.

The fiber according to any one of 1 to 6, wherein the silicone-modified polyurethane resin is a further reaction product of a reaction product of the components (A) to (D) and a crosslinking agent (E).

8.

The fiber according to 7, wherein the component (E) is a carbodiimide-based crosslinking agent, oxazoline-based crosslinking agent, isocyanate-based crosslinking agent, or blocked isocyanate-based crosslinking agent.

9.

A fiber multilayer structure comprising the fiber according to any one of 1 to 8.

10.

The fiber multilayer structure according to 9, the fiber being a nonwoven fabric.

11.

A spinning solution for electrospinning, comprising: an aqueous dispersion of a silicone-modified polyurethane resin that is a reaction product of a polyol (A); a water dispersant (B); an active hydrogen group-containing organopolysiloxane (C) of the following formula (1); and a polyisocyanate (D), and a fiber-forming agent (G), $$R^1R^2R^3SiO(SiR^2R^3O)_nSiR^1R^2R^3 \quad (1)$$

wherein $R^1$ is independently a $C_{1-10}$ monovalent hydrocarbon group having a hydroxyl group or a mercapto group, and optionally having an oxygen atom interposed in the chain, or $C_{1-10}$ monovalent hydrocarbon group having a primary amino group or a secondary amino group, $R^2$ and $R^3$ are each independently a group selected from a linear, branched or cyclic $C_{1-10}$ alkyl group or $C_{7-10}$ aralkyl group in which a part of hydrogen atoms may be substituted with a fluorine atom, a $C_{6-12}$ aryl group optionally having a substituent, and a vinyl group, and n is an integer of 1 to 200.

12.

The spinning solution for electrospinning according to 11, wherein the component (G) is a water-soluble polymer.

13.

The spinning solution for electrospinning according to 11 or 12, wherein the component (G) is polyethylene oxide, polyvinyl alcohol, sodium polyacrylate, or polyvinylpyrrolidone.

14.

The spinning solution for electrospinning according to any one of 11 to 13, wherein the component (B) is a compound having at least one active hydrogen group and at least one hydrophilic group in a molecule.

15.

The spinning solution for electrospinning according to 14, wherein the hydrophilic group of the compound of the component (B) is a carboxy group, sulfonic acid group, or phosphoric acid group.

16.

The spinning solution for electrospinning according to any one of 11 to 15, wherein the component (B) is a compound having at least one hydroxyl group and at least one carboxy group.

17.

The spinning solution for electrospinning according to any one of 11 to 16, wherein in the formula (1), $R^1$ is 2-hydroxyetha-1-yl group, 3-hydroxypropa-1-yl group, 3-(2-hydroxyethoxy)propa-1-yl group, or 3-aminopropa-1-yl group, and $R^2$ and $R^3$ are each methyl group, phenyl group, 3,3,3-trifluoropropyl group, or vinyl group.

18.

The spinning solution for electrospinning according to any one of 11 to 17, further comprising a crosslinking agent (E).

19.

The spinning solution for electrospinning according to 18, wherein the component (E) is a carbodiimide-based crosslinking agent, oxazoline-based crosslinking agent, isocyanate-based crosslinking agent, or blocked isocyanate-based crosslinking agent.

20.

A method for producing a fiber, the method comprising spinning the spinning solution for electrospinning according to any one of 11 to 19 by an electrospinning method.

Advantageous Effects of Invention

The present invention can provide a fiber including a silicone-modified polyurethane resin in consideration of the influence of an organic solvent on the human body and the environment. In addition, using an aqueous dispersion including a silicone-modified polyurethane resin can provide a spinning solution for electrospinning in consideration of the influence of the organic solvent on the human body and the environment. In addition, using water as a solvent can mix an additive with a nano-sized fiber. Furthermore, using the silicone-modified polyurethane resin improves the spinnability, improves the productivity, can produce a nano-sized fiber and a fiber multilayer structure thereof, and adding a crosslinking agent can improve fiber strength and water repellency, thus providing extremely high usefulness. Furthermore, spinning is performed under a high voltage condition in the electrospinning method, and therefore there is a potential risk of ignition if an organic solvent is used; however, the risk can be eliminated by using the spinning solution for electrospinning of the present invention.

DESCRIPTION OF EMBODIMENTS

Figure 1:
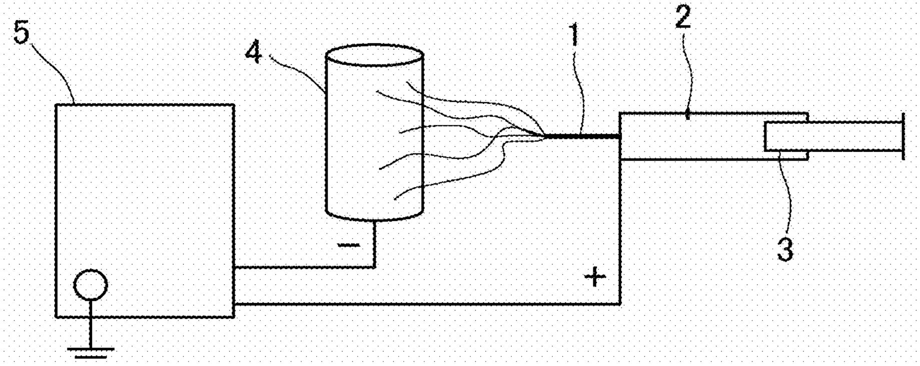
FIG. 1 is a schematic view showing an example of a nozzle type apparatus for producing a fiber multilayer structure by discharging a spinning solution into an electrostatic field by using an electrospinning method.

Hereinafter, the present invention is described in more detail.

[Fiber]

The fiber of the present invention is a fiber formed from a resin including a silicone-modified polyurethane resin that is a reaction product of a polyol (A), a water dispersant (B), an active hydrogen group-containing organopolysiloxane (C) represented by the following formula (1), and a polyisocyanate (D).

The components (A) to (D) are essential components of a composition for synthesizing a silicone-modified polyurethane resin.

Polyol (A)

The polyol (A) used in the present invention is a polymeric polyol having a numerical average molecular weight of 500 or more, preferably 500 to 10,000, more preferably 700 to 3,000, and those other than the active hydrogen group-containing organopolysiloxane (C) can be used. Specific examples of the polymeric polyol include those belonging to the following groups (i) to (vi). In the present invention, the numerical average molecular weight is a value in terms of polymethyl methacrylate by gel permeation chromatography.

(i) Polyether polyol: for example, those obtained by polymerizing or copolymerizing an alkylene oxide (for example, ethylene oxide, propylene oxide, and butylene oxide) and/or a cyclic ether (for example, tetrahydrofuran), specifically, polyethylene glycol, polypropylene glycol, polytetramethylene glycol, polyethylene glycol-polytetramethylene glycol (block or random), polytetramethylene ether glycol, and polyhexamethylene glycol.

(ii) Polyester polyol: for example, those obtained by condensation polymerization of aliphatic dicarboxylic acids (for example, succinic acid, adipic acid, sebacic acid, glutaric acid, and azelaic acid) and/or aromatic dicarboxylic acids (for example, isophthalic acid, and terephthalic acid) and low molecular weight glycols (for example, ethylene glycol, 1,2-propylene glycol, 1,3-propylene glycol, 1,4-butylene glycol, 1,6-hexamethylene glycol, neopentyl glycol, and 1,4-bishydroxymethylcyclohexane), specifically, polyethylene adipate diol, polybutylene adipate diol, polyhexamethylene adipate diol, polyneopentyl adipate diol, polyethylene/butylene adipate diol, polyneopentyl/hexyl adipate diol, poly-3-methylpentane adipate diol, and polybutylene isophthalate diol.

(iii) Polylactone polyol: for example, polycaprolactone diol or triol, and poly-3-methylvalerolactone diol.

(iv) Polycarbonate polyol: for example, specific examples of the polycarbonate polyol include polytrimethylene carbonate diol, polytetramethylene carbonate diol, polypentamethylene carbonate diol, polyneopentyl carbonate diol, polyhexamethylene carbonate diol, poly(1,4-cyclohexanedimethylene carbonate)diol, polydecamethylene carbonate diol, and random/block copolymers thereof.

(v) Polyolefin polyol: for example, polybutadiene glycol, polyisoprene glycol, or a hydride thereof.

(vi) Polymethacrylate polyol: for example, α,ω-polymethyl methacrylate diol, and α,ω-polybutyl methacrylate diol.

Of these, polyether polyol is preferable, and polyethylene glycol, polypropylene glycol, or polytetramethylene ether glycol is more preferable.

Water Dispersant (B)

The water dispersant (B) used in the present invention is one for dispersing a silicone-modified polyurethane resin to be reacted (synthesized) in fine particle form in water. This component (B) is a compound having at least one active hydrogen group (hydroxyl group, amino group, sulfanyl (thiol) group) and at least one hydrophilic group in the molecule, and is specifically a compound that reacts with a polyisocyanate (D) to be described later and has one or more active hydrogen groups that are not an anionic group and a nonionic group and further an anionic group or a nonionic group that is a hydrophilic group. At least one anionic group or nonionic group and at least two active hydrogen groups are preferably contained in the molecule of the compound. Copolymerizing these components (B) in the reaction process for producing the silicone-modified polyurethane resin and introducing a hydrophilic group into the structure in the resin molecule can disperse the silicone-modified polyurethane resin in water in the form of fine particles (also referred to as a urethane dispersion).

The anionic group is not particularly limited, and examples thereof include a carboxy group, a sulfonic acid group, and a phosphoric acid group. Particularly, from the viewpoint of water resistance of the silicone-modified polyurethane resin and raw material availability, a compound having a carboxy group is preferable.

The compound having a carboxy group may be a compound having a hydroxyl group that reacts with the polyisocyanate (D) to form a urethane bond, that is, a compound having at least one hydroxyl group and at least one carboxy group, preferably a compound having at least two hydroxyl groups and at least one carboxy group, and examples thereof include α,α-dimethylolpropanoic acid, α,α-dimethylolbutanoic acid, α,α-dimethylolpropionic acid (DMPA), α,α-dimethylolbutyric acid, dimethylolacetic acid, dihydroxysuccinic acid, and dihydroxybenzoic acid. Particularly, α,α-dimethylolpropanoic acid and α,α-dimethylolbutanoic acid, which are easily available, are preferable.

The compounding amount of the compound having an anionic group in the composition for producing a silicone-modified polyurethane resin used in the present invention is preferably an amount such that the acid value is 5 to 40 mgKOH/g in the mass of the silicone-modified polyurethane resin (value calculated from the blending). If the amount is too small, the resin is insufficient in hydrophilicity and is not dispersed in water, and if the amount is too large, the resin is water-soluble and the dispersibility is deteriorated, the water resistance of the silicone-modified polyurethane resin to be obtained is deteriorated, and the resin may be hard and brittle. The acid value is a numerical value obtained by measurement according to JIS K 2501:2003. In the present invention, the mass of the silicone-modified polyurethane resin refers to the total mass of the composition for synthesizing the silicone-modified polyurethane resin used in the present invention, that is, the components (A) to (D) (if other components such as the components (E) and (F) are added for synthesis, these components are also included), and does not include a solvent such as water or an organic solvent to be finally removed (the same applies hereinafter).

The nonionic group is preferably hydrophilic, and examples thereof include a polyoxyalkylene group having an oxyethylene structure, and a compound including at least one of these groups may be used in the present invention.

Examples of the compound having a polyoxyalkylene group can include a polyether polyol having an oxyethylene structure such as polyoxyethylene glycol, polyoxyethylene polyoxypropylene glycol, and polyoxyethylene polyoxytetramethylene glycol. Any compound selected from these compounds may be used singly, or two or more thereof may be used in combination.

The compounding amount of the compound having a nonionic group is preferably 1 to 20 parts by weight per 100 parts by weight of the silicone-modified polyurethane resin. At less than 1 part by weight, the resulting resin is insufficient in hydrophilicity to be not dispersed in water, and at more than 20 parts by weight, the resulting resin is water-soluble to deteriorate dispersibility, and thus the resulting silicone-modified polyurethane resin may have poor water resistance.

Active Hydrogen Group-Containing Organopolysiloxane (C)

The active hydrogen group-containing organopolysiloxane (C) is an organopolysiloxane represented by the following formula (1).

$$R^1R^2R^3SiO(SiR^2R^3O)_nSiR^1R^2R^3 \quad (1)$$

In the formula, $R^1$ is independently a monovalent hydrocarbon group having 1 to 10 carbon atoms, having a hydroxyl group or mercapto group, and optionally having an oxygen atom interposed in the chain, or a monovalent hydrocarbon group having 1 to 10 carbon atoms and having a primary amino group or secondary amino group. $R^2$ and $R^3$ are each independently a group selected from a linear, branched, or cyclic alkyl group having 1 to 10 carbon atoms or aralkyl group having 7 to 10 carbon atoms in which a part of hydrogen atoms may be substituted with a fluorine atom, aryl group having 6 to 12 carbon atoms and optionally having a substituent, or vinyl group. n is an integer of 1 to 200.

Examples of the $R^1$, the monovalent hydrocarbon group having 1 to 10 carbon atoms, having a hydroxyl group or mercapto group, and optionally having an oxygen atom interposed in the chain, include hydroxymethyl group, 2-hydroxyetha-1-yl group, 2-hydroxyprop-1-yl group, 3-hydroxyprop-1-yl group, 2-hydroxybut-1-yl group, 3-hydroxybut-1-yl group, 4-hydroxybut-1-yl group, 2-hydroxyphenyl group, 3-hydroxyphenyl group, 4-hydroxyphenyl group, 2-(hydroxymethoxy)etha-1-yl group, 2-(2-hydroxyethoxy)etha-1-yl group, 2-(2-hydroxypropoxy)etha-1-yl group, 2-(3-hydroxypropoxy)etha-1-yl group, and 2-(2-hydroxybutoxy)etha-1-yl group, 2-(3-hydroxybutoxy)etha-1-yl group, 2-(4-hydroxybutoxy)etha-1-yl group, 3-(hydroxymethoxy)prop-1-yl group, 3-(2-hydroxyethoxy)prop-1-yl group, 3-(2- hydroxypropoxy)prop-1-yl group, 3-(3-hydroxypropoxy) prop-1-yl group, 3-(2-hydroxybutoxy)prop-1-yl group, 3-(3-hydroxybutoxy)prop-1-yl group, 3-(4-hydroxybutoxy)prop-1-yl group, mercaptomethyl group, 2-mercaptoetha-1-yl group, 2-mercaptoprop-1-yl group, 3-mercaptoprop-1-yl group, 2-mercaptobut-1-yl group, 3-mercaptobut-1-yl group, 4-mercaptobut-1-yl group, 2-(mercaptomethoxy) etha-1-yl group, 2-(2-mercaptoethoxy)etha-1-yl group, 2-(2-mercaptopropoxy)etha-1-yl group, 2-(3-mercaptopropoxy) etha-1-yl group, 2-(2-mercaptobutoxy)etha-1-yl group, 2-(3-mercaptobutoxy)etha-1-yl group, 2-(4-mercaptobutoxy)etha-1-yl group, 3-(mercaptomethoxy)prop-1-yl group, 3-(2-mercaptoethoxy)prop-1-yl group, 3-(2-mercaptopropoxy)prop-1-yl group, 3-(3-mercaptopropoxy)prop-1-yl group, 3-(2-mercaptobutoxy)prop-1-yl group, 3-(3-mercaptobutoxy)prop-1-yl group, 3-(4-mercaptobutoxy)prop-1-yl group, and the like.

Examples of the $R^1$, the monovalent hydrocarbon group having 1 to 10 carbon atoms and having a primary amino group or secondary amino group, include aminomethyl group, 2-aminoeth-1-yl group, 2-aminoprop-1-yl group, 3-aminoprop-1-yl group, 2-aminobut-1-yl group, 3-aminobut-1-yl group, 4-aminobut-1-yl group, N-methylaminomethyl group, N-methyl-2-aminoeth-1-yl group, N-methyl-2-aminoprop-1-yl group, N-methyl-3-aminoprop-1-yl group, N-methyl-2-aminobut-1-yl group, N-methyl-3-aminobut-1-yl group, N-methyl-4-aminobut-1-yl group, N-ethylaminomethyl group, N-ethyl-2-aminoeth-1-yl group, N-ethyl-2-aminoprop-1-yl group, N-ethyl-3-aminoprop-1-yl group, N-ethyl-2-aminobut-1-yl group, N-ethyl-3-aminobut-1-yl group, N-ethyl-4-aminobut-1-yl group, N-butylaminomethyl group, N-butyl-2-aminoeth-1-yl group, N-butyl-2-aminoprop-1-yl group, N-butyl-3-aminoprop-1-yl group, N-butyl-2-aminobut-1-yl group, N-butyl-3-aminobut-1-yl group, N-butyl-4-aminobut-1-yl group, and the like.

Of the $R^1$s, there is preferable a monovalent hydrocarbon group having 2 to 6 carbon atoms, having a primary hydroxyl group or secondary hydroxyl group, and optionally having an oxygen atom interposed in the chain, or monovalent hydrocarbon group having 2 to 6 carbon atoms and having a primary amino group or secondary amino group, and there is more preferable 2-hydroxyetha-1-yl group, 3-hydroxypropa-1-yl group, 3-(2-hydroxyethoxy)propa-1-yl group, 3-aminopropa-1-yl group, and the like.

Examples of the $R^2$ and $R^3$, the linear, branched, or cyclic alkyl group having 1 to 10 carbon atoms or aralkyl group having 7 to 10 carbon atoms, include methyl group, ethyl group, propyl group, isopropyl group, n-butyl group, cyclohexyl group, 2-ethylhexa-1-yl group, 2-phenyletha-1-yl group, 2-methyl-2-phenyletha-1-yl group, and the like.

Examples of the $R^2$ and $R^3$, the linear, branched, or cyclic alkyl group having 1 to 10 carbon atoms in which a part of the hydrogen atoms is substituted with a fluorine atom, include 3,3,3-trifluoropropyl group, 3,3,4,4,4-pentafluorobutyl group, 3,3,4,4,5,5,6,6,6-nonafluorohexyl group, 3,3,4,4,5,5,6,6,7,7,7-undecafluoroheptyl group, 3,3,4,4,5,5,6,6,7,7,8,8,8-tridecafluorooctyl group, 3,3,4,4,5,5,6,6,7,7,8,8,9,9,9-pentadecafluorononyl group, 3,3,4,4,5,5,6,6,7,7,8,8,9,9,10,10,10-heptadecafluorodecyl group, and the like.

Examples of the $R^2$ and $R^3$, the aryl group having 6 to 12 carbon atoms and optionally having a substituent, include phenyl group, 2-methyl-1-phenyl group, 3-methyl-1-phenyl group, 4-methyl-1-phenyl group, 2,3-dimethyl-1-phenyl group, 3,4-dimethyl-1-phenyl group, 2,3,4-trimethyl-1-phenyl group, 2,4,6-trimethyl-1-phenyl group, naphthyl group, and the like.

Of the $R^2$s and $R^3$s, methyl group, phenyl group, 3,3,3-trifluoropropyl group, or vinyl group is preferable.

In the above formula (1), n is an integer of 1 to 200, preferably an integer of 5 to 40. If n is less than the above lower limit, the properties of silicone cannot be obtained, and if n is more than the above upper limit, the viscosity of silicone increases and the terminal reactivity decreases, and the properties as a urethane resin are deteriorated.

Such an active hydrogen group-containing organopolysiloxane (C) may be synthesized according to the required substituents; however, a commercially available product may be used. Examples thereof include the following compound groups (1-1) to (1-6), (2-1) to (2-9), (3-1) to (3-9), and (4-1) to (4-7). In the following formula, Me represents a methyl group, and Ph represents a phenyl group (the same applies hereinafter).

[Chem. 1]

(1-1)

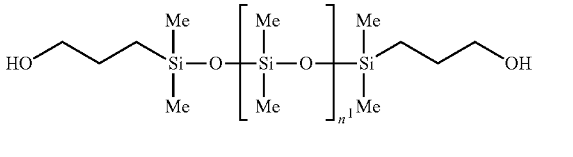

(1-2)

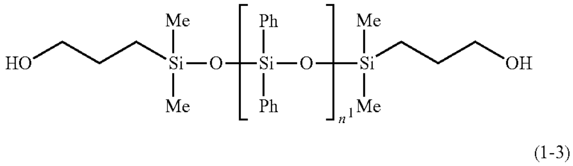

(1-3)

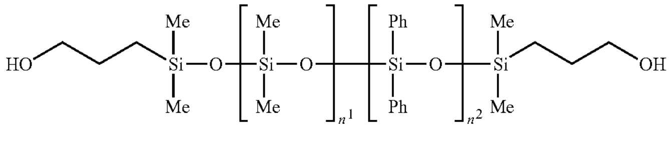

(1-4)

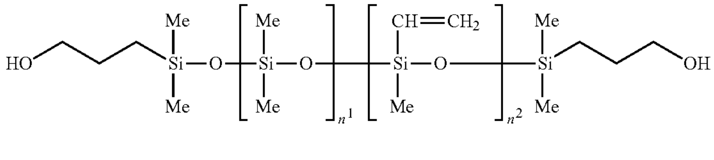

-continued
(1-5)
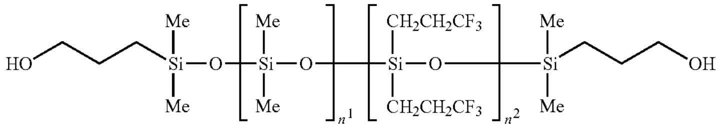
(1-6)
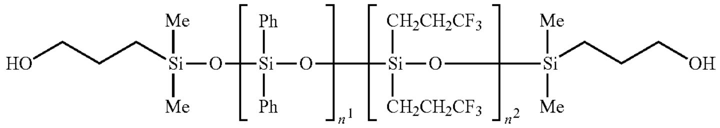
[Chem. 2]
(2-1)
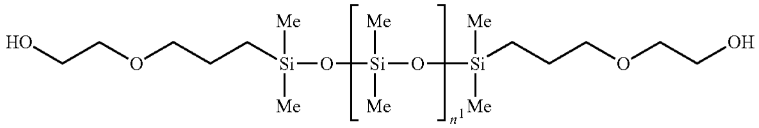
(2-2)
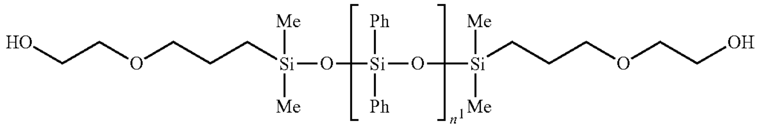
(2-3)
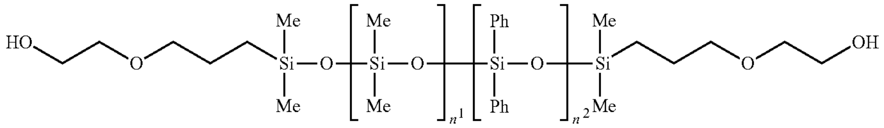
(2-4)
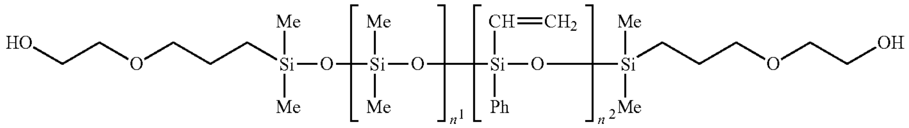
(2-5)
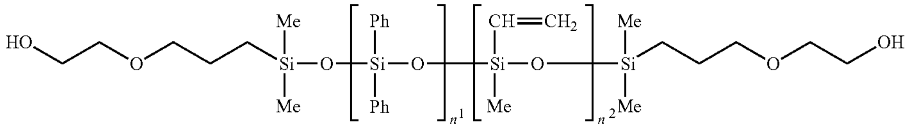
(2-6)
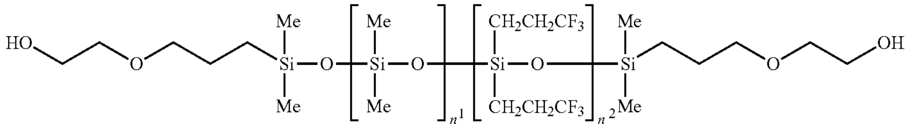
(2-7)
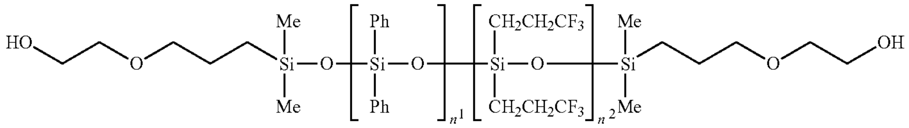
(2-8)
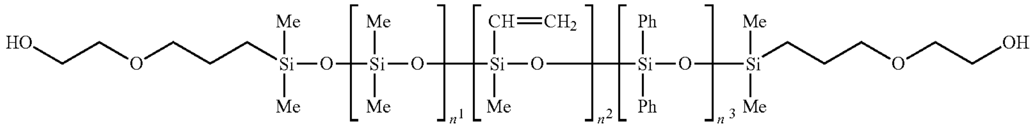
(2-9)
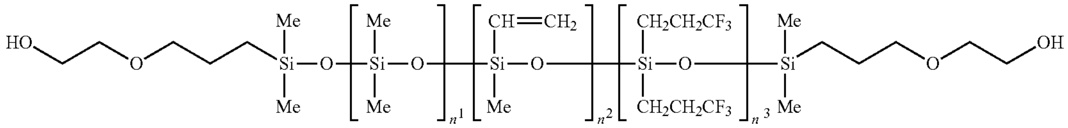

-continued
[Chem. 3]
(3-1)
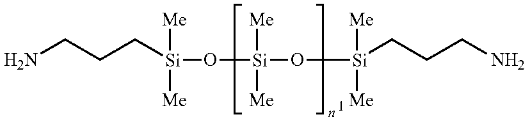
(3-2)
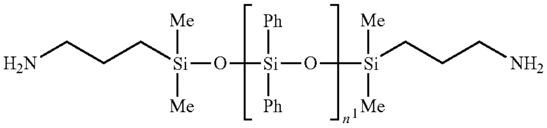
(3-3)
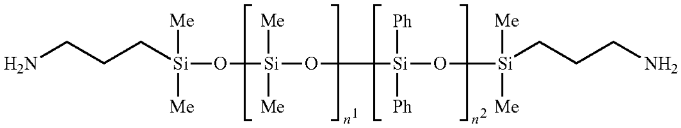
(3-4)
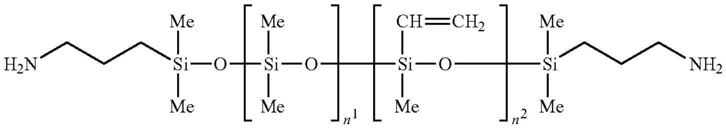
(3-5)
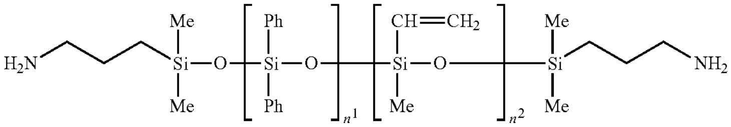
(3-6)
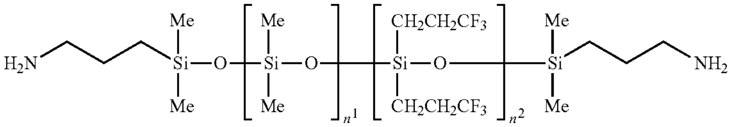
(3-7)
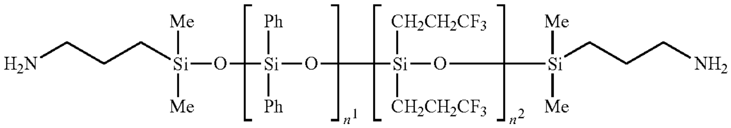
(3-8)
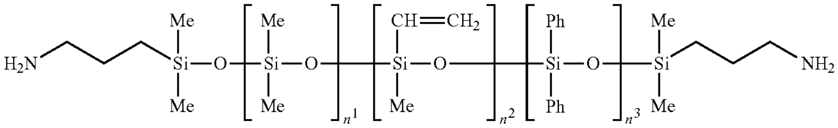
(3-9)
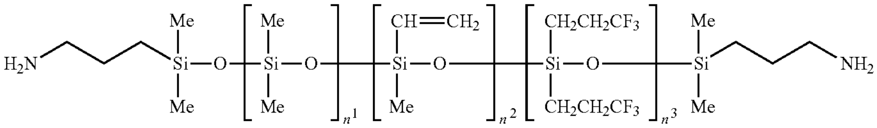
[Chem. 4]
(4-1)
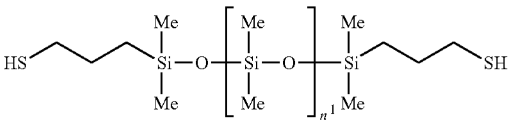
(4-2)
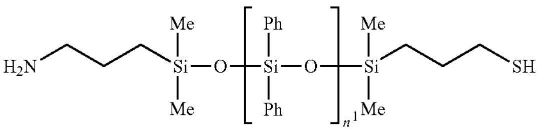
(4-3)
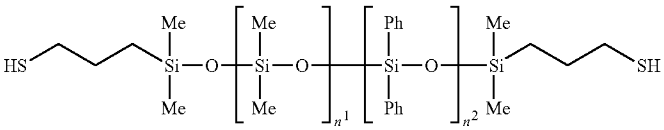

-continued (4-4)

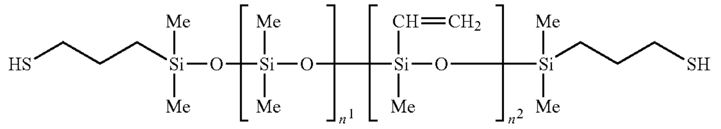

(4-5)

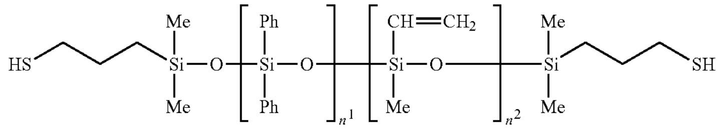

(4-6)

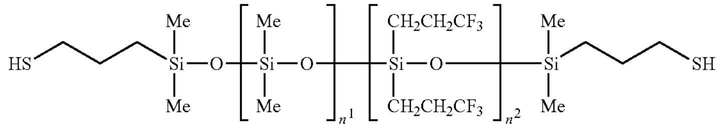

(4-7)

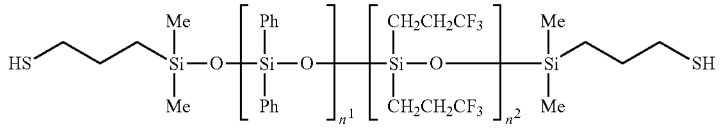

Provided that, in the compound groups (1-1), (1-2), (2-1), (2-2), (3-1), (3-2), (4-1), and (4-2), $n=n^1$ and $n^1$ is 1 or more, and in the compound groups (1-3) to (1-6), (2-3) to (2-7), (3-3) to (3-7), and (4-3) to (4-7), $n^1+n^2=n$ and $n^1$ is 1 or more and $n^2$ is 1 or more, and in the compound groups (2-8), (2-9), (3-8), and (3-9), $n^1+n^2+n^3=n$ and $n^1$, $n^2$, and $n^3$ are each 1 or more.

The arrangement of each repeating unit may be a block or random.

Such a compound can be synthesized by reacting an active hydrogen group-containing disiloxane with a cyclic siloxane having an optional substituent under an acid or alkaline condition.

The compounding amount of the active hydrogen group-containing organopolysiloxane (C) is preferably 0.1 to 50 parts by weight, preferably 0.1 to 40 parts by weight, and more preferably 1 to 30 parts by weight, based on 100 parts by weight of the total amount of the components (A) to (D). The above range is preferable, from the viewpoint of imparting properties of silicone.

Polyisocyanate (D)

Any conventionally known polyisocyanate can be used as the polyisocyanate (D), and preferable examples thereof include: aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 4,4'-methylenebis (phenylene isocyanate) (MDI), julirange isocyanate, tolylene diisocyanate, xylylene diisocyanate (XDI), 1,5-naphthalene diisocyanate, benzidine diisocyanate, o-nitrobenzidine diisocyanate, 4,4'-diisocyanate dibenzyl, methylene diisocyanate, 1,4-tetramethylene diisocyanate, 1,6-hexamethylene diisocyanate, and 1,10-aliphatic diisocyanate; cycloaliphatic diisocyanates such as 1,4-cyclohexylene diisocyanate, 1,5-tetrahydronaphthalene diisocyanate, isophorone diisocyanate, 4,4'-methylenebis(cyclohexyl isocyanate) (H12MDI), and hydrogenated XDI; or a polyurethane prepolymer obtained by reacting these diisocyanate compounds with a low molecular weight polyol or polyamine so that the terminal becomes an isocyanate. Of these, there are preferable 4,4'-methylenebis (phenylene isocyanate), xylylene diisocyanate, 1,6-hexamethylene diisocyanate, isophorone diisocyanate, 4,4'-methylenebis (cyclohexyl isocyanate) (H12MDI), and hydrogenated XDI.

The compounding amount of the polyisocyanate (D) is preferably such that the equivalent ratio of isocyanate groups to active hydrogen groups derived from the components (A) to (C) and, as necessary, the component (F) is 0.9 to 1.1, more preferably 0.95 to 1.05, and particularly preferably 0.99 to 1.01. The equivalent ratio within the above range is preferable, because the fiber can be stably spun without impairing the physical properties as urethane, and the strength can be obtained.

Herein, the synthesis of the silicone-modified polyurethane resin of the present invention may include, in addition to the components (A) to (D), other components such as a chain extender (F), an isocyanate-terminated reaction terminator, a catalyst, and an organic solvent. That is, the silicone-modified polyurethane resin is preferably a reaction product obtained by adding at least one of the chain extender (F), the isocyanate-terminated reaction terminator, and the catalyst to the components (A) to (D).

Chain Extender (F)

The chain extender (F) is preferably a short-chain polyol or polyamine.

Of these, examples of the short-chain polyol include those having a numerical average molecular weight of less than 500, preferably 60 to 500, and more preferably 60 to 300. Examples thereof include: aliphatic glycols such as ethylene glycol, 1,2-propanediol, 1,3-propanediol, 1,4-butanediol, 1,3-butanediol, 1,6-hexamethylene glycol and neopentyl glycol, and alkylene oxide low molar adducts thereof (numerical average molecular weight of less than 500); alicyclic glycols such as 1,4-bishydroxymethylcyclohexane and 2-methyl-1,1-cyclohexanedimethanol and alkylene oxide low molar adducts thereof (numerical average molecular weight of less than 500); aromatic glycols such as xylylene glycol and alkylene oxide low molar adduct thereof (numerical average molecular weight of less than 500); bisphenols such as bisphenol A, thiobisphenol and sulfone bisphenol and alkylene oxide low molar adducts thereof (number average molecular weight: less than 500); alkyl dialkanolamines such as alkyl diethanolamine having 1 to 18 carbon atoms; and polyhydric alcohol-based compound such as glycerin, trimethylolethane, trimethylolpropane, pentaerythritol, tris-(2-hydroxyethyl)isocyanurate, 1,1,1-trimethylolethane, and 1,1,1-trimethylolpropane. Of these, aliphatic glycols are more preferable, and ethylene glycol, 1,3-propanediol, or 1,4-butanediol is still more preferable.

If a short-chain polyol is blended as the component (F), the compounding amount thereof is, for example, preferably 0.1 to 200 parts by weight, and particularly preferably 0.1 to 30 parts by weight per 100 parts by weight of the polyol (A).

In addition, examples of the polyamine include short chain diamines, aliphatic diamines, aromatic diamines, long chain diamines, and hydrazines, and those other than the active hydrogen group-containing organopolysiloxane (C) can be used. Examples of the short-chain diamine include: aliphatic diamine compounds such as ethylenediamine, trimethylenediamine, hexamethylenediamine, trimethylhexamethylenediamine, and octamethylenediamine; aromatic diamine compounds such as phenylenediamine, 3,3'-dichloro-4,4'-diaminodiphenylmethane, 4,4'-methylenebis (phenylamine), 4,4'-diaminodiphenyl ether, and 4,4'-diaminodiphenyl sulfone; and alicyclic diamine compounds such as cyclopentanediamine, cyclohexyldiamine, 4,4-diaminodicyclohexylmethane, 1,4-diaminocyclohexane, and isophoronediamine. Examples of the long chain diamines include those obtained from a polymer or copolymer of alkylene oxide (for example, ethylene oxide, propylene oxide, and butylene oxide), and specific examples thereof include polyoxyethylenediamine and polyoxypropylenediamine. Examples of the hydrazines include hydrazine, carbodihydrazide, adipic acid dihydrazide, sebacic acid dihydrazide, and phthalic acid dihydrazide. In addition, if an amino-modified type silane coupling agent is used, a self-curing reaction type coating material can be designed. Examples thereof include N-2-(aminoethyl)-3-aminopropylmethyldimethoxysilane (KBM-602 manufactured by Shin-Etsu Chemical Co., Ltd.), N-2-(aminoethyl)-3-aminopropylmethyltrimethoxysilane (KBM-603 manufactured by Shin-Etsu Chemical Co., Ltd.), N-2-(aminoethyl)-3-aminopropylmethyldiethoxysilane (KBE-602 manufactured by Shin-Etsu Chemical Co., Ltd.), 3-aminopropyltrimethoxysilane (KBE-603 manufactured by Shin-Etsu Chemical Co., Ltd.), 3-aminopropyltriethoxysilane (KBE-903 manufactured by Shin-Etsu Chemical Co., Ltd.), and 3-ureidopropyltriethoxysilane.

If a polyamine is blended as the component (F), the compounding amount thereof is 1 to 30 parts by weight, preferably 1 to 15 parts by weight, per 100 parts by weight of the total amount of the components (A) to (D).

Isocyanate-Terminated Reaction Terminator

In the step of synthesizing the silicone-modified polyurethane resin of the present invention, if an isocyanate group remains at the polymer terminal, a termination reaction of the isocyanate terminal may be further performed. For example, in addition to monofunctional compounds such as monoalcohols and monoamines, compounds having two functional groups having different reactivity with isocyanates can also be used. Examples thereof include: monoalcohols such as methyl alcohol, ethyl alcohol, n-propyl alcohol, isopropyl alcohol, n-butyl alcohol, isobutyl alcohol, and t-butyl alcohol; monoamines such as monoethylamine, n-propylamine, diethylamine, di-n-propylamine, and di-n-butylamine; and alkanol amines such as monoethanolamine and diethanolamine, and of these, alkanolamines are preferable in that the reaction is easily controlled.

In the case of blending an isocyanate-terminated reaction terminator, the compounding amount thereof is an amount corresponding to 1.0 mol to 1.5 mol, preferably 1.05 mol to 1.4 mol of the reactive functional group of the reaction terminator, per 1 mol of the remaining isocyanate groups.

In this synthesis step, the reaction is preferably performed until the isocyanate group of the prepolymer has the theoretical value (that is, 0 mol %) without using a reaction terminator.

Catalyst

Examples of the catalyst include; salts of organic and inorganic acids and a metal such as a complex obtained by reacting a diol such as tartaric acid with dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis (tridecylmaleate), dibutyltin bis(benzylmaleate), dibutyltin diacetate, dibutyltin bisisooctylthioglycolate, dibutyltin bis 2-ethylhexylthioglycolate, dioctyltin bis(ethylmaleate), dioctyltin bis(octylmaleate), dibutyltin dimethoxide, and the like, a metal such as dibutyltin bis (nonylphenoxide), dibutenyltin oxide, dibutyltin oxide, dibutyltin bis(acetylacetonate), dibutyltin bis(ethylacetoacetonate), a reaction product of dibutyltin oxide and a silicate compound, a reaction product of dibutyltin oxide and a phthalate, lead octylate, tetrabutyl titanate, tetrapropyl titanate, tetraisopropyl titanate, titanium tetrakis (acetylacetonate), titanium diisopropoxybis (acetylacetonate), titanium diisopropoxybis (ethylacetate), or titanium chloride; and tertiary organic base catalysts such as organometallic derivatives, trimethylamine, triethylamine (TEA), diisopropylethylamine (DIPEA), tri-n-butylamine, tri-n-pentylamine, tri-n-hexylamine, tri-n-heptylamine, tri-n-octylamine, N-methylpyrrolidine, N-methylpiperidine, N-methylmorpholine (NMO), N,N,N',N'-tetramethylethylenediamine (TMEDA), N-methylimidazole (NMI), pyridine, 2,6-lutidine, 1,3,5-colidine, N,N-dimethylaminopyridine (DMAP), pyrazine, quinoline, 1,8-diazabicyclo[5,4,0]-7-undecene (DBU), and 1,4-diazabicyclo-[2,2,2]octane (DABCO).

The amount of the catalyst used is a catalyst amount, and is preferably 0.01 to 10 mol % and more preferably 0.1 to 5 mol % per the total amount of the components (A) to (D).

Organic Solvent

The silicone-modified polyurethane resin in the present invention may be synthesized without a solvent, or may be synthesized by using an organic solvent as necessary. The preferable organic solvents are those free of an active hydrogen group in the molecule, and examples thereof include those that are inert to isocyanate groups or have lower activity than active hydrogen groups (alcohol, amine, and thiol) such as the components (A), (B), (C), and (F).

Examples thereof include: ketone-based solvents (for example, acetone, methyl ethyl ketone, methyl isobutyl ketone, cyclohexanone, and menthone); aromatic-based hydrocarbon solvents (for example, toluene, o-xylene, m-xylene, p-xylene, 1,3,5-methythylene, 1,2,3-methythylene, 1,2,4-methicylene, ethylbenzene, n-propyl benzene, i-propylbenzene, n-butylbenzene, i-butylbenzene, sec-butylbenzene, t-butylbenzene, n-pentylbenzene, i-pentylbenzene, sec-pentylbenzene, t-pentylbenzene, n-hexyl benzene, i-hexylbenzene, sec-hexylbenzene, t-hexylbenzene, Swazole (aromatic hydrocarbon solvent manufactured by Cosmo Oil Co., Ltd.), and Solvesso (aromatic hydrocarbon solvent manufactured by Exxonmobil Chemical Company); hydrocarbon-based solvents (for example, pentane, hexane, heptane, octane, nonane, cyclopentane, cyclohexane, cycloheptane, cyclooctane, methylcyclohexane, ethylcyclohexane, propylcyclohexane, n-butylcyclohexane, i-butylcyclohexane, sec-butyl cyclohexane, t-butylcyclohexane, n-pentylcyclohexane, i-pentylcyclohexane, sec-pentylcyclohexane, t-pentylcyclohexane, n-hexylcyclohexane, i-hexylcyclohexane, sec-hexylcyclohexane, t-hexylcyclohexane, and limonene); alcohol-based solvents (for example, methyl alcohol, ethyl alcohol, isopropyl alcohol, s-butyl alcohol, iso-butyl alcohol, and t-butyl alcohol); ether-based solvents (for example, diethyl ether, t-butyl methyl ether (TBME), dibutyl ether, cyclopentyl methyl ether (CPME), diphenyl ether, dimethoxymethane (DMM), tetrahydrofuran (THF), 2-methyltetrahydrofuran, 2-ethyltetrahydropyran, tetrahydropyran (THP), dioxane, trioxane, 1,2-dimethoxyethane, diethylene glycol dimethyl ether, and diethylene glycol diethyl ether); ester-based solvents (for example, ethyl acetate, butyl acetate, and isobutyl acetate); glycol ether ester-based solvents (for example, ethylene glycol ethyl ether acetate, propylene glycol methyl ether acetate, 3-methyl-3-methoxybutyl acetate, and ethyl-3-ethoxypropionate); amide-based solvents (for example, dimethylformamide (DMF), dimethylacetamide (DMAc), N-methyl-2-pyrrolidone (NMP), 1,3-dimethyl-2-imidazolidinone (DMI), and 1,3-dimethyl-3,4,5,6-tetrahydro-2(1H)-pyrimidinone (DMPU)); and nitrile-based solvents (for example, acetonitrile, propionitrile, butyronitrile, and benzonitrile). Of these, methyl ethyl ketone, acetone, and tetrahydrofuran are preferable in consideration of solubility, reactivity, boiling point, miscibility in water, and emulsifying dispersibility in water during solvent recovery and urethane synthesis.

The compounding amount of the organic solvent is preferably 200 parts by weight or less, and more preferably 100 parts by weight or less per 100 parts by weight of the silicone-modified polyurethane resin.

Herein, the silicone-modified polyurethane resin is preferably further a reaction product of a reaction product of the components (A) to (D) and the crosslinking agent (E). This can improve the durability and strength of the obtained fiber and fiber multilayer structure.

Crosslinking Agent (E)

Examples of the crosslinking agent (E) can include conventionally known crosslinking agents such as a compound having a carbodiimide group (carbodiimide-based crosslinking agent), a compound having an oxazoline group (oxazoline-based crosslinking agent), a compound having an aziridine group (aziridine-based crosslinking agent), a compound having an isocyanate group (including a block type) (isocyanate-based crosslinking agent), and a compound having an epoxy group (epoxy-based crosslinking agent). Examples of the compound having an oxazoline group include D-54 crosslinking agents manufactured by Dainichiseika Color & Chemicals Mfg. Co., Ltd.; examples of the compound having a carbodiimide group include D-505 crosslinking agents manufactured by Dainichiseika Color & Chemicals Mfg. Co., Ltd.; examples of the compound having an aziridine group include CHEMITITE PZ-33 and DZ-22 E manufactured by Nippon Shokubai Co., Ltd.; and examples of the compound having an isocyanate group include ELASTOLON BN manufactured by DKS Co., Ltd., and D-65 crosslinking agents manufactured by Dainichiseika Color & Chemicals Mfg. Co., Ltd. Of these crosslinking agents, a carbodiimide-based crosslinking agent, oxazoline-based crosslinking agent, isocyanate-based crosslinking agent, or blocked isocyanate-based crosslinking agent is preferable.

The compounding amount of the component (E) is preferably 1 to 10 parts by weight per 100 parts by weight of the silicone-modified polyurethane resin. Adding the crosslinking agent can improve the durability and strength of the polyurethane resin, and at more than the above range, the resin is brittle, and there may be an adverse effect such that an unreacted crosslinking agent becomes a plasticizer.

Further reaction between the reaction product of the components (A) to (D) and the crosslinking agent (E) is promoted in the heating stage after fiberization.

In the present invention, various additives such as inorganic or organic fillers can be blended for the purpose of improving various properties of the obtained fiber. In the case of blending additives, a predetermined amount thereof is preferably added into the reaction system during synthesis of the silicone-modified polyurethane resin, because of allowing providing the silicone-modified polyurethane resin in which additives such as fillers are uniformly dispersed.

In addition, a resin composition in which other resins are mixed may be used as long as the effect of the present invention is not impaired. Furthermore, additives such as a nucleating agent, carbon black, a pigment such as an inorganic baked pigment, an antioxidant, a stabilizer, a plasticizer, a lubricant, a release agent, and a flame retardant can be added to impart desired properties as long as the effect of the invention is not impaired.

The fiber according to the present invention is formed of a resin including the silicone-modified polyurethane resin. The resin is preferably formed only of the silicone-modified polyurethane resin; however, may contain, as necessary, a vinyl resin, an acrylic resin, a methacrylic resin, an epoxy resin, a urethane resin, an olefin resin, and a silicone resin singly or in combination of two or more in an amount of more than 0 wt % and 50 wt % or less, and more preferably more than 0 wt % and 20 wt % or less.

Furthermore, the fiber according to the present invention may include a fiber-forming agent (G) described later.

The fiber according to the present invention is formed by a method for producing a fiber to be described later, and is preferably a fiber having an average fiber diameter of less than 2,000 nm, and more preferably a nanofiber having an average fiber diameter of 1,000 nm or less.

The average fiber diameter referred to herein is an average value obtained by photographing a target fiber (specifically, the surface of the fiber multilayer structure) with a scanning electron microscope (SEM), and measuring diameters of optional 20 fibers (n=20) from the photograph.

[Fiber Multilayer Structure]

The fiber multilayer structure according to the present invention includes the fiber of the present invention described above. Herein, the fiber multilayer structure refers to a three-dimensional structure in which the obtained single or plurality of fibers are laminated. Specific examples of the form of the fiber multilayer structure include a nonwoven fabric, a tube, and a mesh, and the nonwoven fabric is preferable.

[Spinning Solution for Electrospinning]

A spinning solution for electrospinning according to the present invention is a spinning solution for forming the fiber of the present invention by an electrospinning method, comprising: an aqueous dispersion of a silicone-modified polyurethane resin that is a reaction product of a polyol (A), a water dispersant (B), an active hydrogen group-containing organopolysiloxane (C) represented by the following formula (1), and a polyisocyanate (D); and a fiber-forming agent (G), $$R^1R^2R^3SiO(SiR^2R^3O)_nSiR^1R^2R^3 \quad (1)$$

wherein $R^1$ is independently a monovalent hydrocarbon group having a hydroxyl group or mercapto group, having 1 to 10 carbon atoms, and optionally having an oxygen atom interposed in the chain, or monovalent hydrocarbon group having a primary amino group or secondary amino group and having 1 to 10 carbon atoms, $R^2$ and $R^3$ are each independently a group selected from a linear, branched or cyclic alkyl group having 1 to 10 carbon atoms or aralkyl group having 7 to 10 carbon atoms in which a part of hydrogen atoms may be substituted with a fluorine atom, aryl group optionally having a substituent and having 6 to 12 carbon atoms, or vinyl group, and n is an integer of 1 to 200.

The spinning solution for electrospinning according to the present invention is preferably prepared through the following two steps. The first step is a step of preparing an aqueous dispersion of a silicone-modified polyurethane resin, and the second step is a step of preparing a spinning solution in which the fiber-forming agent (G) and water are added to the aqueous dispersion of the silicone-modified polyurethane resin.

First Step

The first step is a step of synthesizing a silicone-modified polyurethane resin, and a known method for synthesizing polyurethane can be used. For example, in the absence of a solvent (solvent-free) or in the presence of an organic solvent free of an active hydrogen group in the molecule described above and in a formulation in which the equivalent ratio of the isocyanate group to the active hydrogen group is 0.9 to 1.1, there can be performed a one-shot method in which the above-described components, that is, the polyol (A), the water dispersant (B), the active hydrogen group-containing organopolysiloxane (C), the polyisocyanate (D), and the chain extender (F) used as necessary are simultaneously reacted, or a multistage method in which one or more of the components (A) to (D) are reacted in a stepwise manner. The reaction temperature in this case is typically 20 to 150° C., and preferably 50 to 110° C. The produced resin is emulsified by adding water and a neutralizing agent as necessary, and then subjected to removal of an organic solvent as necessary, thereby allowing providing an aqueous dispersion of the silicone-modified polyurethane resin used in the present invention.

During the reaction, progress of the reaction may be confirmed by measuring NCO % of the reaction product by a method described in JIS K 6806.

As the water, for example, deionized water (ion-exchanged water), distilled water, and pure water are preferable. The amount of water added is preferably an amount at which the silicone-modified polyurethane resin concentration is 0.1 to 80 wt %. The above range of the addition amount is preferable, because the aqueous dispersion is stable.

Neutralizing Agent

In the first step (synthesis of silicone-modified polyurethane resin), if a compound having an anionic group is used as the component (B), the anionic group in the solution may be partially or entirely neutralized by using a neutralizing agent as necessary.

Examples of the neutralizing agent for the compound having an anionic group include basic compounds, and there can be used, for example, basic compounds including organic amines such as ammonia, triethylamine, pyridine, and morpholine, alkanolamines such as ethanolamine and dimethylethanolamine, and alkali metals and alkaline earth metals such as sodium, potassium, lithium, and calcium.

The amount of the neutralizing agent to be added may be equivalent to the amount of the anionic group to be neutralized, and may be adjusted depending on dispersibility.

The method for removing the organic solvent is not particularly limited, and a widely used method capable of removing the organic solvent can be used, and the removal is preferably performed by, for example, an atmospheric pressure or reduced pressure strip method and a distillation method.

The volume average particle diameter of silicone-modified polyurethane resin fine particles in an aqueous dispersion (polyurethane dispersion) in which the silicone-modified polyurethane resin prepared in the first step is dispersed in water in the form of fine particles is preferably 0.001 to 0.3 μm, and more preferably 0.005 to 0.2 μm. At less than the above range, the viscosity is high, and thus handling is difficult and particles are unstable. In addition, at more than the above range, the stability of the dispersion state is deteriorated such that sedimentation occurs over time.

The average particle diameter can be determined, for example, as a volume average value (or median diameter) by a laser beam diffraction method.

Second Step

The second step is a step of adding the fiber-forming agent (G) and water to the aqueous dispersion of the silicone-modified polyurethane resin to prepare a spinning solution for electrospinning.

Fiber-Forming Agent (G)

The fiber-forming agent (G) is added to the aqueous dispersion of the silicone-modified polyurethane resin, and spinning can be performed while including the resin during spinning by the electrospinning method. There is preferable a water-soluble polymer that does not inhibit the stability of the aqueous dispersion after the addition, and examples thereof include polyethylene oxide, polyvinyl alcohol, sodium polyacrylate, and polyvinylpyrrolidone.

The amount of the fiber-forming agent (G) added is 0.1 to 500 parts by weight per 100 parts by weight of the silicone-modified polyurethane resin. The addition amount within the above range is particularly preferable, because the spinnability is improved.

As water, for example, deionized water (ion-exchanged water), distilled water, and pure water are preferable.

In addition, the amount of water to be added is preferably such that the content (polymer concentration) of the silicone-modified polyurethane resin is in the range of 0.1 to 50 wt %, and more preferably 10 to 30 wt %.

In the present invention, the polymer concentration refers to a calculated value obtained by dividing the resin content by the total amount of the aqueous dispersion.

The temperature for preparation is not particularly limited, and as the molecular weight increases, the solubility decreases and the viscosity increases, and therefore the preparation may be performed by heating. In this case, stirring is performed for 1 minute to 48 hours, preferably 1 hour to 24 hours, for example, in the range of room temperature (20±15° C. (the same applies hereinafter)) to 80° C., preferably in the range of room temperature to 60° C., as long as physical properties are not affected.

The solid content concentration of the spinning solution refers to a nonvolatile content dried at 105° C. for 3 hours. The solid content concentration is preferably 5 to 50 wt %, and more preferably 10 to 40 wt %. The solid content concentration within the above range is preferable from the viewpoint of stability of the dispersion, spinnability, and economic efficiency.

Water is used as a solvent used when fibers are produced by the electrospinning method; however, a small amount of an organic solvent may be added within a range in which safety can be secured in order to adjust the volatilization rate of water. Those having no environmental load or biotoxicity are preferable, and the addition amount is preferably in a range in which the dispersed state of the aqueous dispersion is stable and no solvent remains after spinning.

In the second step, the crosslinking agent (E) described above is further added and mixed to prepare a spinning solution for electrospinning. In the present invention, the durability and strength of the obtained fiber and fiber multilayer structure can be improved.

In addition, in the second step, in order to impart functionality to the obtained fiber and fiber multilayer structure, an additive may be further added as long as physical properties are not impaired. The additives are preferably water-soluble and are preferably mixed in the second step. Examples of the additives include antioxidants and ultraviolet absorbers for improving durability, dyes and pigments for imparting designability, and antibacterial agents and deodorants for imparting functionality.

The fiber of the present invention can be produced by using the spinning solution for electrospinning obtained as described above.

[Method for Producing Fiber]

The method for producing the fiber according to the present invention is characterized in that the spinning solution for electrospinning obtained as described above is spun by the electrospinning methods (electrostatic spinning method, electrospinning method, and melting method).

In the electrospinning method, a fiber is formed by discharging a spinning solution including a polymer into an electrostatic field formed by applying a high voltage between electrodes of a spinning portion and a collecting portion. The nonwoven fabric can be obtained, for example, by setting a collecting substrate in the vicinity of the collecting portion and laminating thereon. Herein, the nonwoven fabric is not limited to a state in which water or a solvent such as a trace amount of an organic solvent has already been evaporated and removed, and also refers to a state of including a solvent.

A spinning apparatus with the electrospinning method preferably used in the present invention is described. Any of a metal, an inorganic material, and an organic material that exhibits conductivity can be used as the electrode. In addition, there may be used those having a thin film of a metal, an inorganic material, or an organic material that exhibits conductivity on an insulator. The electrostatic field is formed by applying a high voltage between the electrodes of the spinning portion and the collecting portion, and may be formed between a pair or a plurality of electrodes. For example, there may also be a case of using a total of three electrodes including two electrodes having different voltage values (for example, 15 kV and 10 kV) and an electrode connected to the ground is also included, or there may also be a case of using more than three electrodes.

Any method can be used to discharge the spinning solution prepared as described to above into the electrostatic field. For example, in FIG. 1, a spinning solution 2 is supplied to a spinning solution tank provided with a nozzle 1, and the spinning solution is discharged from the spinning solution tank fixed in an electrostatic field to be formed into a fiber. For this purpose, an appropriate apparatus can be used, and for example, a nozzle type spinning apparatus and a wire type spinning apparatus can be used.

In the nozzle type spinning apparatus, as shown in FIG. 1, an appropriate means, for example, a nozzle 1 having an injection needle shape, and an electrode and a collecting substrate 4, which are collecting portions, are installed at an appropriate distance at a tip of a spinning solution holding portion of a cylindrical syringe 3 serving as a spinning portion, and a voltage is applied to each of them by a high voltage generator 5 to eject a spinning solution 2 from the tip of the nozzle 1, whereby a fiber can be formed between the tip of the nozzle 1 and the collecting substrate 4. In this case, the spinning may be performed while the syringe is swung so that the fibers are evenly laminated on the collecting substrate.

Figure 2:
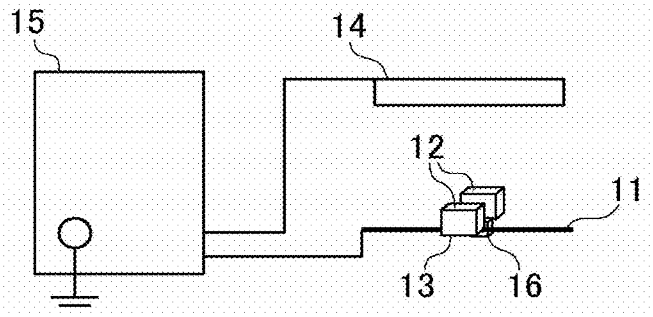
FIG. 2 is a schematic view showing an example of a wire type apparatus for producing a fiber multilayer structure by discharging a spinning solution into an electrostatic field by using the electrospinning method.

In addition, as shown in FIG. 2, a wire type spinning apparatus in which a wire 11 is installed for spinning can be used instead of the nozzle 1. In the wire type spinning apparatus, a high voltage is applied between the wire serving as the spinning portion and the collecting substrate 14 serving as the collecting portion to form an electrostatic field, and a part of the wire is once immersed in the immersion portion filled with the spinning solution 12 to perform spinning by thinly wetting the surface of the wire. Examples of the method for wetting the wire surface include a method in which a wire is passed through an immersion portion 16 capable of supplying the spinning solution from the spinning solution tank 13, a part of the wire is immersed in the spinning solution, and the immersion portion 16 moves or reciprocates on the wire.

As another method of introducing the spinning solution into the electrostatic field, a known method can be used, and for example, an electrode paired with an electrode for collecting the fiber multilayer structure may be inserted directly into a syringe having a nozzle and including the spinning solution. The syringe often has a small volume, and therefore a tank may be used instead of a syringe, and spinning may be performed from a nozzle at the bottom by applying pressure from the top of the tank, or spinning may be performed from a nozzle at the top of the tank by applying pressure from the bottom of the tank. In this case, it is also possible to arrange an electrode near the blowout port without directly attaching the electrode to the nozzle, and to laminate on the collecting substrate with assist air (JP-A 2010-121221). Whereas, as another spinning method using no nozzle or no wire, an electrostatic spinning method using a rotating roll has been proposed. For example, the method is to immerse a rotating roll in a bath filled with a polymer solution, attach the polymer solution onto a surface of the roll, apply a high voltage to the surface thereof, and perform the electrostatic spinning.

If the spinning solution is supplied from the nozzle into the electrostatic field, the production speed of the fiber multilayer structure can also be increased by providing several nozzles (JP-A 2007-303031) and a blowing portion for assist air (JP-A 2014-47440). In addition, there is a method in which in order to improve the quality, an electrode body is arranged between a nozzle and a collecting substrate and a predetermined potential is applied to improve the orientation of nanofibers (JP-A 2008-223186), and the uniform fiber diameter and high processing speed can be achieved by providing an assist air blowing portion in a plurality of nozzles and using nozzles with the position therebetween controlled (JP-A 2014-177728), or by using a gear pump when feeding a mixed solution to a plurality of nozzles (JP-A 2010-189771).

In the case of the nozzle type spinning apparatus, the distance between the electrodes of the spinning portion and the collecting portion depends on the voltage, the nozzle dimension (inner diameter), the spinning solution flow rate (supply rate), and the polymer concentration, and in order to suppress corona discharge, for example, if the applied voltage is 10 to 20 kV, the distance is preferably 5 to 30 cm. Spinning under vacuum is also possible as another method for suppressing corona discharge.

In addition, the wire type spinning apparatus depends on the voltage, the wire dimension (inner diameter), the carriage speed (immersion portion moving speed), and the polymer concentration, and for example, if the applied voltage is 20 to 80 kV, the distance from the wire to the collecting substrate is preferably 17 to 25 cm.

The magnitude of the voltage to be applied is not particularly limited, and the voltage to be applied is preferably 3 to 100 kV, and more preferably 5 to 80 kV.

In the nozzle type spinning apparatus, the dimension (inner diameter) of the nozzle through which the spinning solution is ejected is not particularly limited, and is preferably 0.05 to 2 mm, and more preferably 0.1 to 1 mm in consideration of the balance between the productivity and the obtained fiber diameter.

In addition, the supply rate (or extrusion rate) of the spinning solution is not particularly limited, and an appropriate value is particularly set because the intended fiber diameter is affected. The supply rate of the spinning solution is preferably 0.01 to 0.1 ml/min per nozzle.

In the wire type spinning apparatus, the carriage speed is not particularly limited, and is preferably adjusted by the fiber diameter, the polymer concentration, and the fiber-forming agent to be used. The moving speed of the collecting substrate is not particularly limited, and is preferably adjusted according to the purpose or use, in relation to the basis weight or thickness of the fiber multilayer structure.

The above is a case where the electrode also serves as a collecting substrate, and fibers can also be collected on a collecting substrate installed between the electrodes. In this case, continuous production is also possible, for example, by installing a belt-shaped repair substrate between the electrodes.

If the spinning solution is laminated on the collecting substrate, a solvent such as water or a trace amount of an organic solvent is evaporated to form a fiber multilayer structure. Generally, at room temperature, the solvent evaporates until is collected on the collecting substrate; however, if the evaporation of the solvent is insufficient, spinning may be performed under reduced pressure conditions. In addition, the spinning environmental temperature depends on the evaporation of a solvent and the viscosity of a spinning solution. Generally, the temperature is 0 to 50° C.; however, if an organic solvent having low volatility is included, the temperature may be more than 50° C. as long as the functions of the spinning apparatus and the obtained fiber multilayer structure are not impaired. The humidity is appropriately 0 to 50% RH, and can be appropriately changed depending on, for example, the polymer concentration and the solid content concentration. Therefore, a temperature control mechanism and a humidity control mechanism can be provided in a syringe or a tank for supplying a spinning solution.

The fiber of the present invention may be used singly, or may be used in combination with other members in accordance with handling and other requirements. For example, using a support substrate such as a nonwoven fabric, a woven fabric, and a film as a collecting substrate and laminating the fiber of the present invention thereon can also produce a composite material in which the support substrate and the fiber multilayer structure of the present invention are combined.

The method for producing the fiber according to the present invention may further incorporate a water washing step and/or a heating step after obtaining the fiber as described above.

Water Washing Step and/or Heating Step

The water washing step is a step of partially or completely removing the fiber-forming agent (G) included in the fibers by water washing. The water washing condition is not particularly limited as long as the fiber-forming agent is removed, and water washing may be performed at room temperature or dissolution may be performed by heating or boiling.

In addition, the heating step may be performed for the purpose of, for example, increasing the strength by fusing the fiber or promoting the crosslinking reaction, or may be performed for exhibiting the effect of improving the durability and the effect of improving the strength of the crosslinking agent if the crosslinking agent (E) component is added to the spinning solution. Conditions of the heating step are, for example, 30 to 180° C., preferably 40 to 150° C., and preferably for 0.05 to 72 hours.

The fiber obtained by the present invention is a fiber having an average fiber diameter of less than 2,000 nm, preferably a nanofiber having an average fiber diameter of 1,000 nm or less, depending on the particle diameter of the dispersion of the resin. The average fiber diameter of less than 2,000 nm can provide the nano-size effect as compared with a normal fiber. The shape of the obtained fiber may be, for example, a shape having a small fiber diameter deviation or a paternoster shape in which beads aggregated in a part of the fiber are present, depending on the purpose.

Examples of applications of the fiber and the fiber multilayer structure of the present invention include filters, clothing, biocompatible materials, and various other applications.

Examples of the filter application include an air filter as a constituent member of HEPA or ULPA, a gas permeable membrane, a gas separation membrane, a battery separator requiring micropores, and a polymer electrolyte membrane of a fuel cell.

Examples of the use of the clothing application include a protective tool that directly covers the mouth and nose, such as a neck warmer or a face mask, and discomfort due to stuffiness caused by exhalation can be prevented. Examples thereof include sportswear that quickly releases sweat, and a climbing wear, a winter innerwear material, and a fabric of a lining material of an outerwear because of having heat retention due to low thermal conductivity.

Examples of the use of the biocompatible material include a catheter, a medical tube such as an artificial blood vessel, a scratch material such as a scratch pad, gauze, and a culture medium for regenerative medical engineering.

Examples of other applications include polishing pads such as glass and metal silicon, cosmetic tools such as puffs, clean cloths used for dirt removal, surface members of artificial leather, and sheet materials capable of enclosing food additives by using water-soluble nanofibers and releasing slowly.

EXAMPLES

Hereinafter, the present invention is described more specifically with reference to Examples and Comparative Examples; however, the present invention is not limited to these Examples. The "part" and "%" in Examples and Comparative Examples are on a mass basis unless otherwise specified. In addition, the evaluation items in the following Examples and Comparative Examples were performed by the following methods.

In the following Examples, the numerical average molecular weight (Mn) is a value in terms of polymethyl methacrylate (PMMA) measured by gel permeation chromatography (GPC). GPC measurement was performed under the conditions of apparatus: HLC-8320GPC (manufactured by Tosoh Corporation), solvent: tetrahydrofuran (THF), and resin concentration: 0.1%.

<First Step: Synthesis of Silicone-Modified Polyurethane Resin>

Synthesis Example 1: Synthesis of SiPUD1

A reaction vessel equipped with a stirrer, a reflux condenser, a thermometer, a nitrogen inlet tube, and an inlet was prepared. While the inside of the reaction vessel was replaced with nitrogen gas, (A) 180.0 g of polytetramethylene glycol (trade name: PolyTHF2000, manufactured by BASF Japan Ltd., numerical average molecular weight 2,000), (C) 35.0 g of bi-terminal type silicone diol (in the compound (2-1), $n^1$=20), (B) 20.0 g of DMPA (α,α-dimethylolpropionic acid) (acid value in urethane resin: 23 mgKOH/g), and 112.4 g of acetone were added thereto. Heating and stirring were started, and if the inside of the system was uniform, 102.0 g of (D) 4,4'-methylenebis (cyclohexyl isocyanate) (H12MDI) was charged, and heating and stirring were continued, and the reaction was performed at 75° C. until the NCO % of the prepolymer reached the theoretical value, thereby synthesizing a prepolymer of a terminal isocyanate.

Then, 112.3 g of acetone was charged, the inside of the system was cooled, the internal temperature decreased to 60° C., thereafter 15.1 g of triethylamine (TEA) was added as a neutralizing agent, and the inside of the system was uniformly stirred. After confirming that the inside of the system was uniform, 686.9 g of ion-exchanged water was charged and emulsified while stirring. (F) A mixture of 22.1 g of isophoronediamine (IPDA) and 110.0 g of ion-exchanged water was added thereto to elongate the chain. In this case, the equivalent ratio of the isocyanate group to the active hydrogen group was 1. Thereafter, acetone was distilled off by reducing the pressure while heating to 65° C. to provide an aqueous dispersion SiPUD1 of a silicone-modified polyurethane resin having a silicone content of 10.1 wt % and a solid content concentration of 30 wt %. The results are shown in Table 1.

Synthesis Example 2: Synthesis of SiPUD2

A reaction vessel equipped with a stirrer, a reflux condenser, a thermometer, a nitrogen inlet tube, and an inlet was prepared. While the inside of the reaction vessel was replaced with nitrogen gas, (A) 180.0 g of polytetramethylene glycol (trade name: PolyTHF2000, manufactured by BASF Japan Ltd., numerical average molecular weight 2,000), (C) 35.0 g of bi-terminal type silicone diol (in the compound (2-1), $n^1$=40), (B) 20.0 g of DMPA (acid value in urethane resin: 24 mgKOH/g), and 111.1 g of acetone were added thereto. Heating and stirring were started, and if the inside of the system was uniform, (D) 98.3 g of H12MDI was charged, and heating and stirring were continued, and the reaction was performed at 75° C. until the NCO % of the prepolymer reached the theoretical value, thereby synthesizing a prepolymer of a terminal isocyanate.

Then, 111.1 g of acetone was charged, the inside of the system was cooled, the internal temperature decreased to 60° C., thereafter 15.1 g of TEA was added, and the inside of the system was uniformly stirred. After confirming that the inside of the system was uniform, 681.3 g of ion-exchanged water was charged and emulsified while stirring. 21.2 g of IPDA and 106.0 g of ion-exchanged water was added thereto to elongate the chain. In this case, the equivalent ratio of the isocyanate group to the active hydrogen group was 1. Thereafter, acetone was distilled off by reducing the pressure while heating to 65° C. to provide an aqueous dispersion SiPUD2 of a silicone-modified polyurethane resin having a silicone content of 10.2 wt % and a solid content of 30 wt %. The results are shown in Table 1.

<Synthesis of Silicone-Free Polyurethane Resin>

Comparative Synthesis Example 1: Synthesis of PUD1

A reaction vessel equipped with a stirrer, a reflux condenser, a thermometer, a nitrogen inlet tube, and an inlet was prepared. While the inside of the reaction vessel was replaced with nitrogen gas, (A) 230.0 g of polytetramethylene glycol (trade name: PolyTHF2000, manufactured by BASF Japan Ltd., numerical average molecular weight 2,000), 2.0 g of 1,3-butanediol, and (B) 16.0 g of DMPA, and 116.3 g of acetone were added thereto. Heating and stirring were started, and if the inside of the system was uniform, (D) 100.9 g of H12MDI was charged, and heating and stirring were continued, and the reaction was performed at 75° C. until the NCO % of the prepolymer reached the theoretical value, thereby synthesizing a prepolymer of a terminal isocyanate.

Then, 116.3 g of acetone was charged, the inside of the system was cooled, the internal temperature decreased to 60° C., thereafter 12.0 g of TEA was added, and the inside of the system was uniformly stirred. After confirming that the inside of the system was uniform, 718.5 g of ion-exchanged water was charged and emulsified while stirring. (F) 21.8 g of IPDA and 109.0 g of ion-exchanged water was added thereto to elongate the chain. In this case, the equivalent ratio of the isocyanate group to the active hydrogen group was 1. Thereafter, acetone was distilled off by reducing the pressure while heating to 65° C. to provide an aqueous dispersion PUD1 of a silicone-free polyurethane resin having a silicone content of 0 wt % and a solid content of 30 wt %. The results are shown in Table 1.

TABLE 1

| Composition (g) | | Synthesis Example 1 SiPUD1 | Synthesis Example 2 SiPUD2 | Comparative Synthesis Example 1 PUD1 |
|---|---|---|---|---|
| (A) | PolyTHF2000 | 180.0 | 180.0 | 230.0 |
| (B) | DMPA | 20.0 | 20.0 | 16.0 |
| (C) | Compound 2-1, n = 20 | 35.0 | — | — |
| | Compound 2-1, n = 40 | — | 35.0 | — |
| | 1,3-Butanediol | — | — | 2.0 |
| (D) | H12MDI | 102.0 | 98.3 | 100.9 |
| Solvent | Acetone | 224.7 | 222.2 | 232.6 |
| Neutralizing agent | TEA | 15.1 | 15.1 | 12.0 |
| (F) | IPDA | 22.1 | 21.2 | 21.8 |

TABLE 1-continued

| Composition (g) | | Synthesis Example 1 SiPUD1 | Synthesis Example 2 SiPUD2 | Comparative Synthesis Example 1 PUD1 |
|---|---|---|---|---|
| Water | Ion-exchanged water | 796.9 | 787.3 | 827.5 |
| Aqueous dispersion | Solid content (wt %) | 30 | 30 | 30 |
| Resin | Silicone content (wt %) | 10.1 | 10.2 | 0 |

<Second Step: Step of Preparing Spinning Solution> and <Step of Spinning by Electrospinning Method>

The aqueous dispersion of the silicone-modified polyurethane resin of Synthesis Examples 1 and 2 described above and the aqueous dispersion of the silicone-free polyurethane resin obtained in Comparative Synthesis Example 1 were subjected to fiberization by using an electrospinning apparatus (nozzle type spinning apparatus: NEU nanofiber electrospinning unit, manufactured by KATO TECH CO., LTD., or wire type spinning apparatus: Nanospider (trade mark) NS Lab manufactured by Elmarco Ltd.). Details are described below.

<Average Fiber Diameter>

The surface of the fiber multilayer structure composed of fibers obtained in Examples and Comparative Examples was photographed by using a scanning electron microscope (SEM), the fiber diameters of 20 optional fibers were measured from the photograph (n=20), and the average value thereof was taken as an average fiber diameter.

Example 1: Preparation of Spinning Solution and Fiberization for SiPUD1

Figure 3:
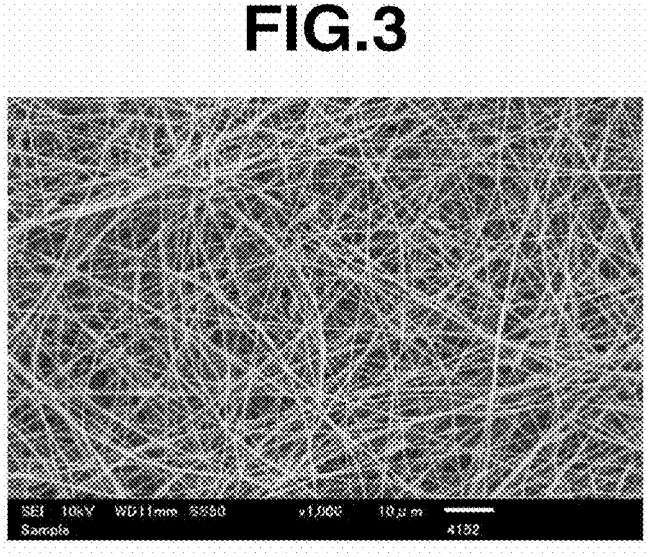
FIG. 3 is an SEM photograph (magnification of 1,000 times) of the surface of the fiber multilayer structure obtained in Example 1.

Polyethylene oxide (0.5 g, Mw=500,000) as a fiber-forming agent (G) and water (10.0 g) were added to the SiPUD1 (2.00 g) obtained in Synthesis Example 1, and stirring was performed at 50 to 60° C. for 24 hours to provide a uniform milky white spinning solution. Using the electrospinning apparatus (NEU nanofiber electrospinning unit, manufactured by KATO TECH CO., LTD.) shown in FIG. 1, the spinning solution was discharged to the collecting substrate 4 for 30 minutes under the conditions of spinning environment temperature of 24° C., spinning environment humidity of 50% RH, inner diameter of the nozzle of the spinning portion 1 of 0.4 mm, voltage of 15 kV, distance from the nozzle of the spinning portion 1 to the collecting substrate 4 of 18 cm, and supply rate of the spinning solution of 0.02 mL/min. The obtained fibers had an average fiber diameter of 480 nm (0.48 μm). A scanning electron micrograph of the obtained fiber and the surface of the fiber multilayer structure is shown in FIG. 3.

Example 2

Figure 4:
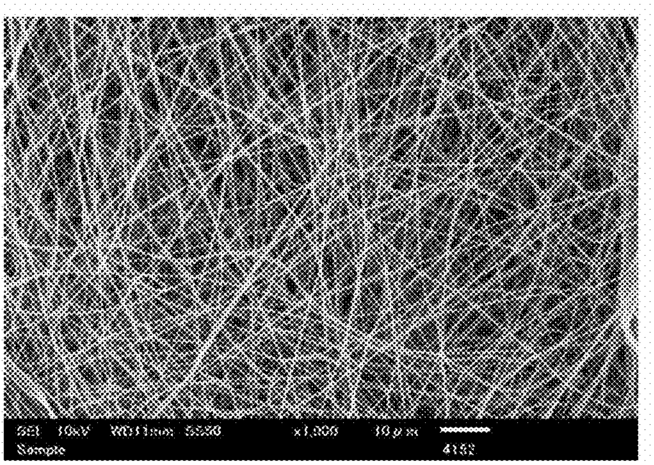
FIG. 4 is an SEM photograph (magnification of 1,000 times) of the surface of the fiber multilayer structure obtained in Example 2.

Spinning was performed under the same conditions as in Example 1, except that the applied voltage was changed to 20 kV in Example 1, and the average fiber diameter of the obtained fibers was 390 nm (0.39 μm). A scanning electron micrograph of the obtained fiber and the surface of the fiber multilayer structure is shown in FIG. 4.

Example 3

Figure 5:
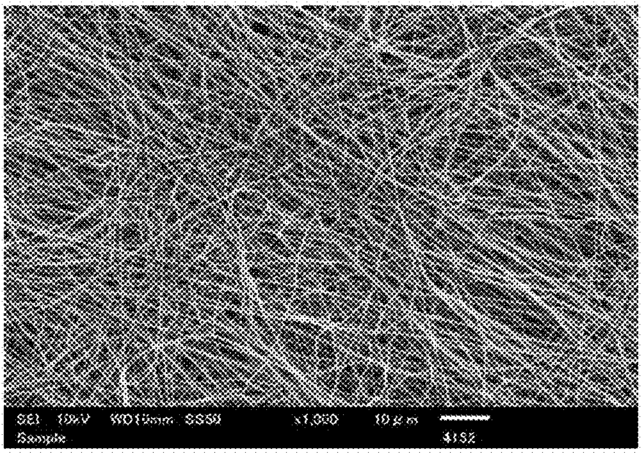
FIG. 5 is an SEM photograph (magnification of 1,000 times) of the surface of the fiber multilayer structure obtained in Example 3.

Spinning was performed under the same conditions as in Example 2, except that the distance from the nozzle of the spinning portion 1 to the collecting substrate 4 was changed to 15 cm in Example 2, and the average fiber diameter of the obtained fibers was 320 nm (0.32 μm). A scanning electron micrograph of the obtained fiber and the surface of the fiber multilayer structure is shown in FIG. 5.

Example 4: Change in Ratio of Fiber-Forming Agent Added

Figure 6:
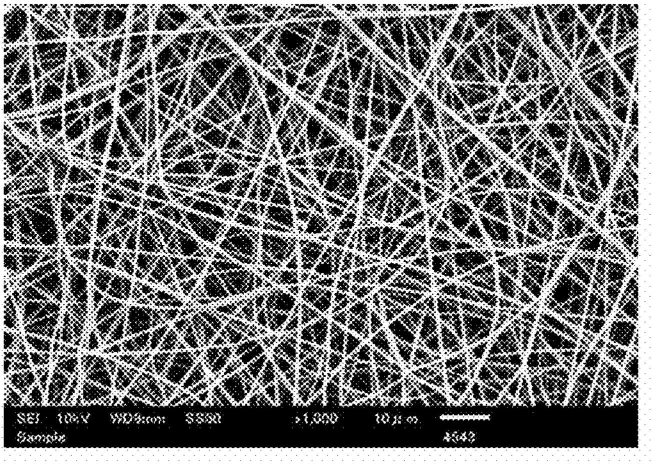
FIG. 6 is an SEM photograph (magnification of 1,000 times) of the surface of the fiber multilayer structure obtained in Example 4.

Polyethylene oxide (0.5 g, Mw=500,000) as a fiber-forming agent (G) and water (10.0 g) were added to the SiPUD1 (2.83 g) obtained in Synthesis Example 1, and stirring was performed at 50 to 60° C. for 24 hours to provide a uniform milky white spinning solution. Using the electrospinning apparatus (NEU nanofiber electrospinning unit, manufactured by KATO TECH CO., LTD.) shown in FIG. 1, the spinning solution was discharged to the collecting substrate 4 for 30 minutes under the conditions of spinning environment temperature of 24° C., spinning environment humidity of 50% RH, inner diameter of the nozzle of the spinning portion 1 of 0.4 mm, voltage of 20 kV, distance from the nozzle of the spinning portion 1 to the collecting substrate 4 of 15 cm, and supply rate of the spinning solution of 0.02 mL/min. The obtained fibers had an average fiber diameter of 530 nm (0.53 μm). A scanning electron micrograph of the obtained fiber and the surface of the fiber multilayer structure is shown in FIG. 6.

Example 5: Change in Ratio of Fiber-Forming Agent Added

Figure 7:
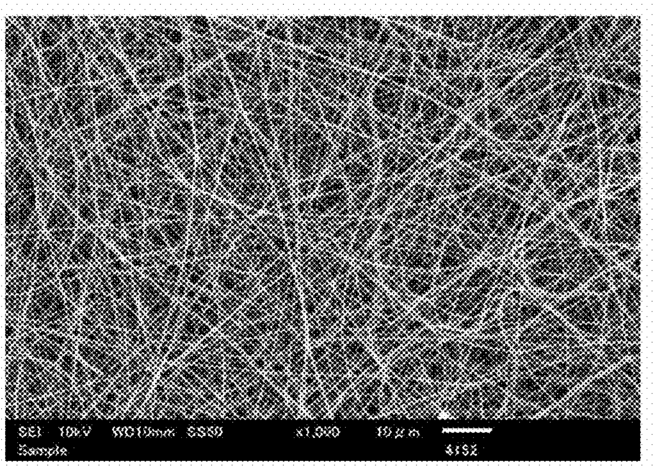
FIG. 7 is an SEM photograph (magnification of 1,000 times) of the surface of the fiber multilayer structure obtained in Example 5.

Polyethylene oxide (0.5 g, Mw=500,000) as a fiber-forming agent and water (10.5 g) were added to the SiPUD1 (4.50 g) obtained in Synthesis Example 1, and stirring was performed at 50 to 60° C. for 24 hours to provide a uniform milky white spinning solution. The spinning solution was discharged to the collecting substrate 4 for 30 minutes with the electrospinning apparatus and the same conditions as shown in Example 4. The obtained fibers had an average fiber diameter of 430 nm (0.43 μm). A scanning electron micrograph of the obtained fiber and the surface of the fiber multilayer structure is shown in FIG. 7.

Example 6

Figure 8:
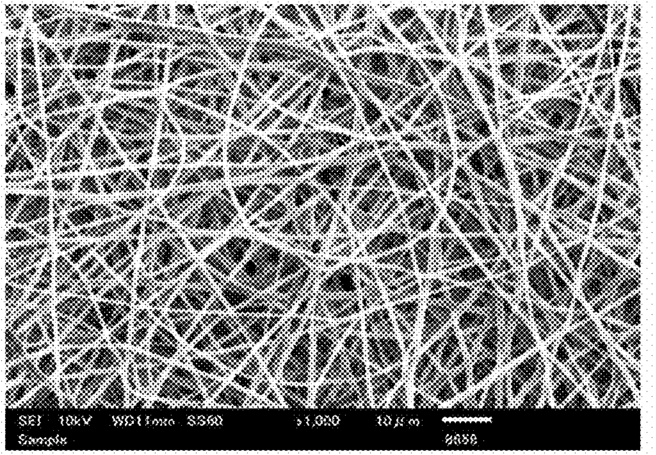
FIG. 8 is an SEM photograph (magnification of 1,000 times) of the surface of the fiber multilayer structure obtained in Example 6.

Spinning was performed under the same conditions as in Example 5, except that the time for discharging the spinning solution to the collecting substrate 4 was changed to 3 hours in Example 5, and the average fiber diameter of the obtained fibers was 890 nm (0.89 μm). A scanning electron micrograph of the obtained fiber and the surface of the fiber multilayer structure is shown in FIG. 8.

Example 7: Preparation of Spinning Solution and Fiberization for SiPUD2

Figure 9:
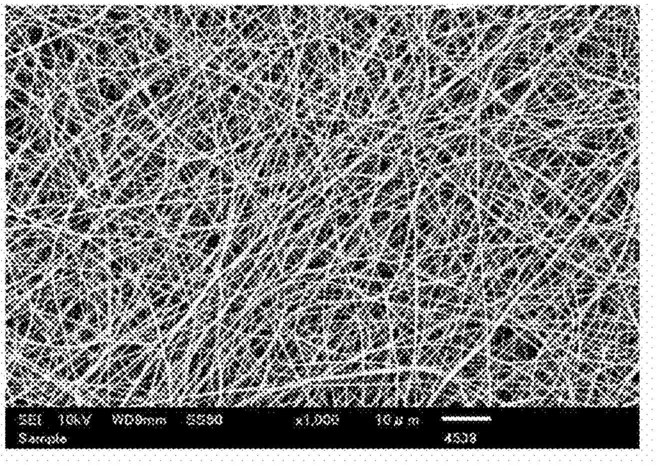
FIG. 9 is an SEM photograph (magnification of 1,000 times) of the surface of the fiber multilayer structure obtained in Example 7.

A spinning solution was prepared and spinning was performed under the same conditions as in Example 3, except that the aqueous dispersion of the silicone-modified polyurethane resin was changed to the aqueous dispersion of SiPUD2 obtained in Synthesis Example 2 in Example 3, and the average fiber diameter of the obtained fibers was 370 nm (0.37 μm). A scanning electron micrograph of the obtained fiber and the surface of the fiber multilayer structure is shown in FIG. 9.

Example 8: Change in Ratio of Fiber-Forming Agent Added

Figure 10:
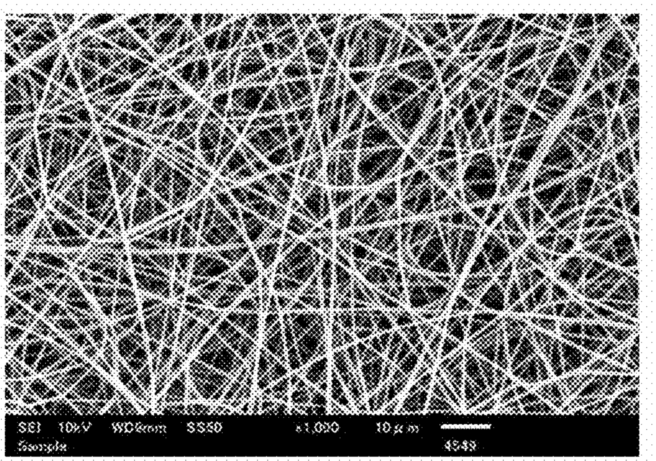
FIG. 10 is an SEM photograph (magnification of 1,000 times) of the surface of the fiber multilayer structure obtained in Example 8.

A spinning solution was prepared and spinning was performed under the same conditions as in Example 4, except that the aqueous dispersion of the silicone-modified polyurethane resin was changed to the aqueous dispersion of SiPUD2 obtained in Synthesis Example 2 in Example 4, and the average fiber diameter of the obtained fibers was 560 nm (0.56 μm). A scanning electron micrograph of the obtained fiber and the surface of the fiber multilayer structure is shown in FIG. 10.

Example 9: Change in Ratio of Fiber-Forming Agent Added

Figure 11:
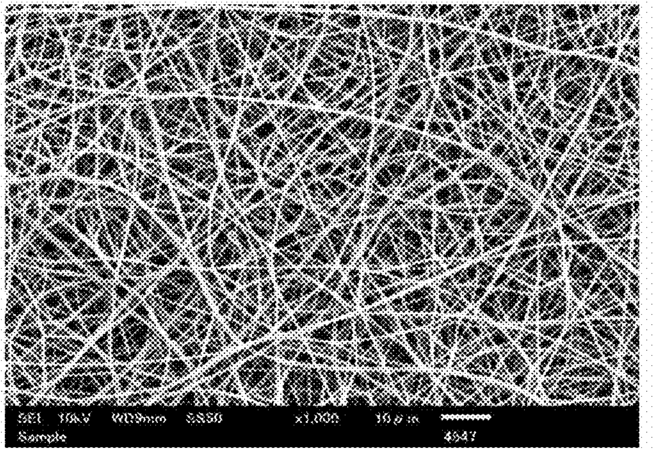
FIG. 11 is an SEM photograph (magnification of 1,000 times) of the surface of the fiber multilayer structure obtained in Example 9.

A spinning solution was prepared and spinning was performed under the same conditions as in Example 5, except that the aqueous dispersion of the silicone-modified polyurethane resin was changed to the aqueous dispersion of SiPUD2 obtained in Synthesis Example 2 in Example 5, and the average fiber diameter of the obtained fibers was 530 nm (0.53 μm). A scanning electron micrograph of the obtained fiber and the surface of the fiber multilayer structure is shown in FIG. 11.

Example 10: Preparation of Spinning Solution and Fiberization for SiPUD1

Figure 12:
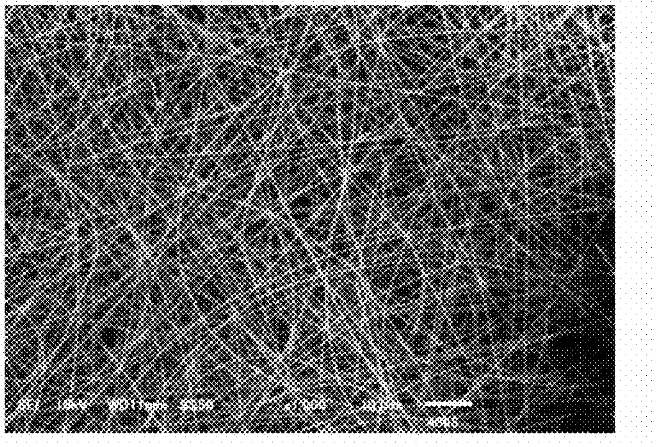
FIG. 12 is an SEM photograph (magnification of 1,000 times) of the surface of the fiber multilayer structure obtained in Example 10.

The SiPUD1 (100 g) obtained in Synthesis Example 1 and 15 wt % of polyvinyl alcohol aqueous solution (100 g) as a fiber-forming agent (G) were added, and stirring was performed at 22° C. for 24 hours to provide a uniform milky white spinning solution. Using an electrospinning apparatus (Nanospider (trade mark) NS Lab, manufactured by Elmarco Ltd.) shown in FIG. 2, the spinning solution was spun into the collecting substrate 14 under the conditions of spinning environment temperature of 20° C., spinning environment humidity of 30% RH, voltage of 30 to 40 kV, distance from the wire 11 of the spinning portion to the collecting substrate 14 of 17 cm, reciprocating speed (carriage speed) of the immersion portion 16 of 50 to 100 mm/s, and moving speed of the collecting substrate 14 of 2 to 5 mm/s. The obtained fibers had an average fiber diameter of 560 nm (0.56 μm). A scanning electron micrograph of the obtained fiber and the surface of the fiber multilayer structure is shown in FIG. 12.

Example 11: Change in Ratio of Fiber-Forming Agent Added

Figure 13:
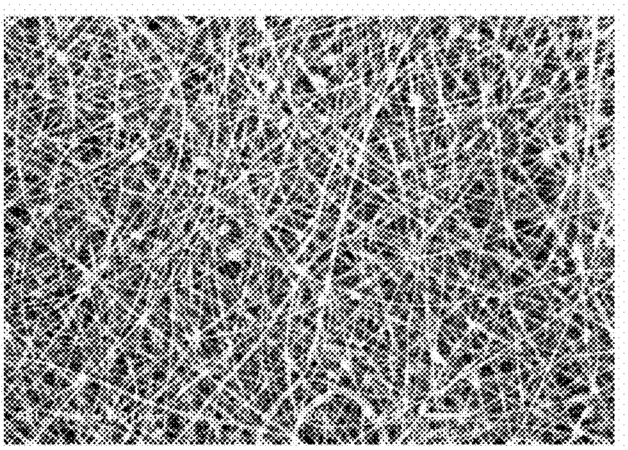
FIG. 13 is an SEM photograph (magnification of 1,000 times) of the surface of the fiber multilayer structure obtained in Example 11.

A spinning solution was prepared and spinning was performed under the same conditions as in Example 10, except that the amount of the 15 wt % of aqueous polyvinyl alcohol solution was changed to 50 g in Example 10, and the average fiber diameter of the obtained fibers was 400 nm (0.40 μm). A scanning electron micrograph of the obtained fiber and the surface of the fiber multilayer structure is shown in FIG. 13.

Example 12: Preparation of Spinning Solution and Fiberization for SiPUD1

Figure 14:
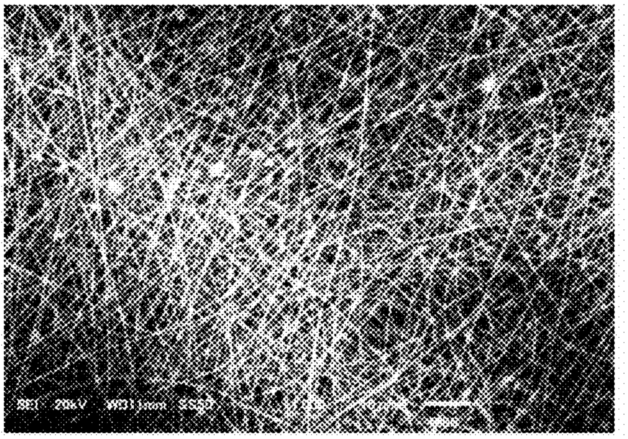
FIG. 14 is an SEM photograph (magnification of 1,000 times) of the surface of the fiber multilayer structure obtained in Example 12.

A spinning solution was prepared and spinning was performed under the same conditions as in Example 10, except that the aqueous dispersion of the silicone-modified polyurethane resin was changed to the aqueous dispersion of SiPUD2 obtained in Synthesis Example 2 in Example 10, and the average fiber diameter of the obtained fibers was 480 nm (0.48 μm). A scanning electron micrograph of the obtained fiber and the surface of the fiber multilayer structure is shown in FIG. 14.

Example 13: Change in Ratio of Fiber-Forming Agent Added

Figure 15:
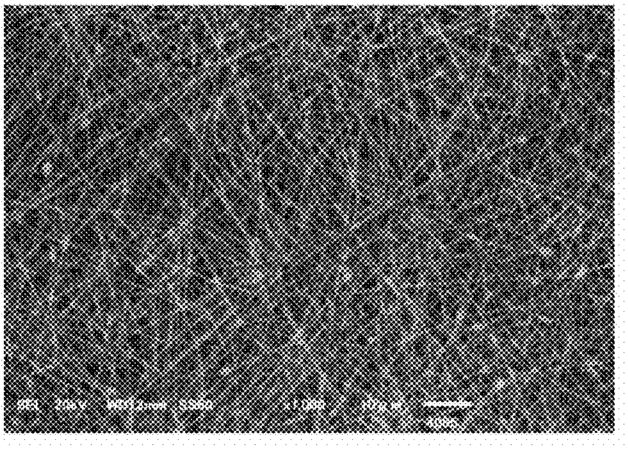
FIG. 15 is an SEM photograph (magnification of 1,000 times) of the surface of the fiber multilayer structure obtained in Example 13.

A spinning solution was prepared and spinning was performed under the same conditions as in Example 11, except that the aqueous dispersion of the silicone-modified polyurethane resin was changed to the aqueous dispersion of SiPUD2 obtained in Synthesis Example 2 in Example 11, and the average fiber diameter of the obtained fibers was 410 nm (0.41 μm). A scanning electron micrograph of the obtained fiber and the surface of the fiber multilayer structure is shown in FIG. 15.

Example 14: Step of Heating Treatment

Figure 16:
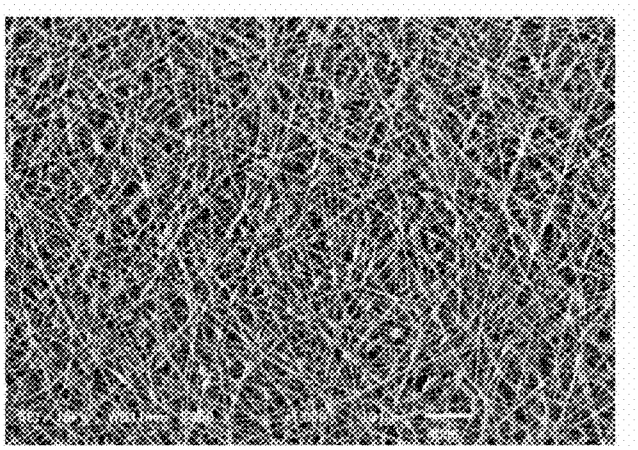
FIG. 16 is an SEM photograph (magnification of 1,000 times) of the surface of the fiber multilayer structure obtained in Example 14.
Figure 17:
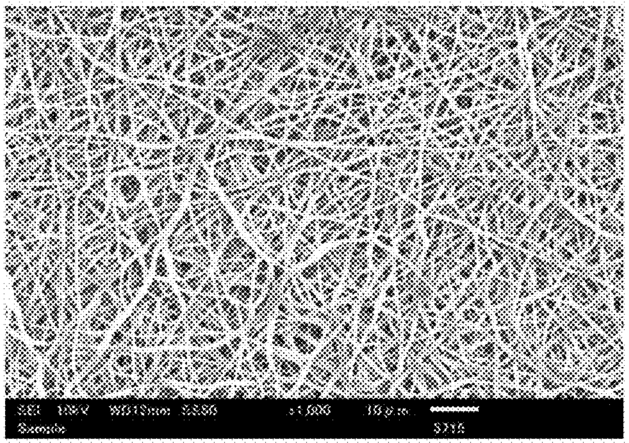
FIG. 17 is an SEM photograph (magnification of 1,000 times) of the surface of the fiber multilayer structure obtained in Example 15.
Figure 18:
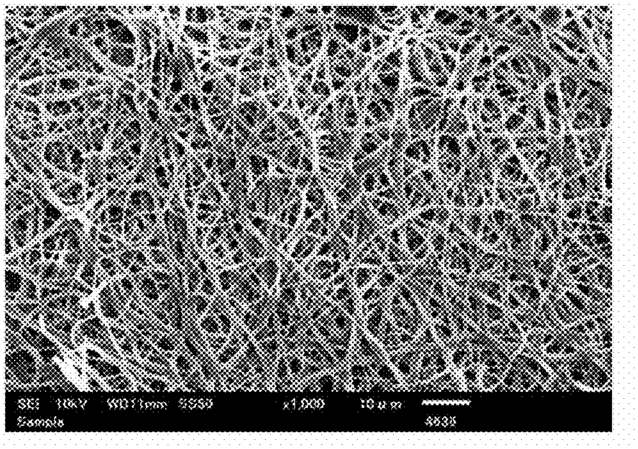
FIG. 18 is an SEM photograph (magnification of 1,000 times) of the surface of the fiber multilayer structure obtained in Example 16.
Figure 19:
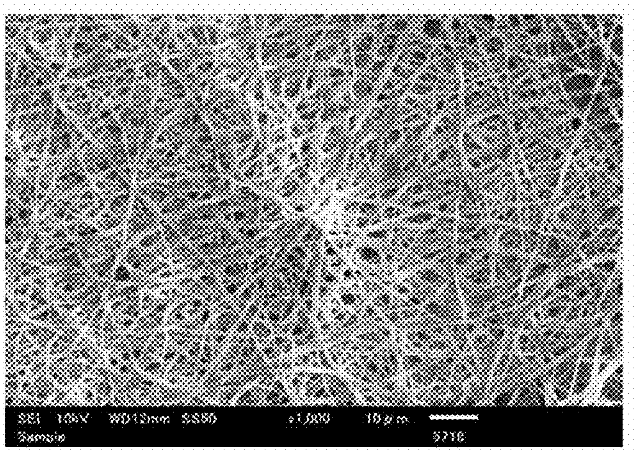
FIG. 19 is an SEM photograph (magnification of 1,000 times) of the surface of the fiber multilayer structure obtained in Example 17.
Figure 20:
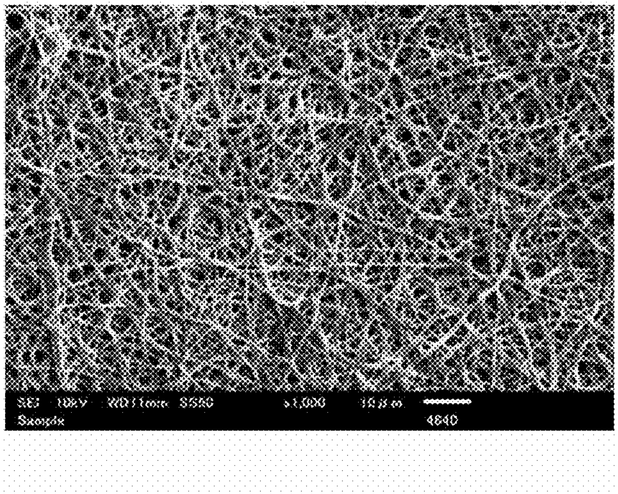
FIG. 20 is an SEM photograph (magnification of 1,000 times) of the surface of the fiber multilayer structure obtained in Example 18.

The fiber and the fiber multilayer structure obtained in Example 11 were heated at 100° C. for 3 minutes. The obtained fibers had an average fiber diameter of 400 nm (0.40 μm). A scanning electron micrograph of the obtained fiber and the surface of the fiber multilayer structure is shown in FIG. 16.

Examples 15 to 18: Step of Water Washing

The fiber and the fiber multilayer structure obtained in Examples 4, 5, 8, and 9 were immersed in water for 24 hours to remove the fiber-forming agent. As a result of checking the surface with a scanning electron microscope, the shapes of the fiber and the fiber multilayer structure were maintained. The average fiber diameter of the obtained fibers is shown in Table 2. A scanning electron micrograph of the obtained fiber and the surface of the fiber multilayer structure is shown in FIGS. 17 to 20.

TABLE 2

| (Water washing) | Example 15 | Example 16 | Example 17 | Example 18 |
|---|---|---|---|---|
| Fiber multilayer structure used | Example 4 | Example 5 | Example 8 | Example 9 |
| Average fiber diameter | 720 nm | 730 nm | 740 nm | 680 nm |

Comparative Example 1: No Addition of Fiber-Forming Agent

Using the electrospinning apparatus (NEU nanofiber electrospinning unit, manufactured by KATO TECH CO., LTD.)

shown in FIG. 1, the spinning solution of SiPUD1 (10.00 g) obtained in Synthesis Example 1 was discharged to the collecting substrate 4 for 30 minutes under the conditions of spinning environment temperature of 24° C., spinning environment humidity of 50% RH, inner diameter of the nozzle 1 of the spinning portion of 0.4 mm, voltage of 15 to 25 kV, and distance from the nozzle 1 of the spinning portion to the collecting substrate 4 of 10 to 18 cm. Observation of the surface of the collecting substrate with a scanning electron microscope found that no fiber was observed, and fine particles were obtained.

Comparative Example 2: No Addition of Fiber-Forming Agent

Using an electrospinning apparatus (Nanospider (trade mark) NS Lab, manufactured by Elmarco Ltd.) shown in FIG. 2, the spinning solution of SiPUD1 (2.00 g) obtained in Synthesis Example 1 was spun into the collecting substrate 14 under the conditions of spinning environment temperature of 25° C., spinning environment humidity of 40% RH, voltage of 30 to 80 kV, distance from the wire 11 of the spinning portion to the collecting substrate 14 of 18 cm, carriage speed of 100 mm/s, and moving speed of the collecting substrate of 0 mm/s. However, no fiber was obtained <Fiberization of Silicone-Free Polyurethane Resin>

Comparative Example 3: Preparation of Spinning Solution and Fiberization for PUD1

Figure 21:
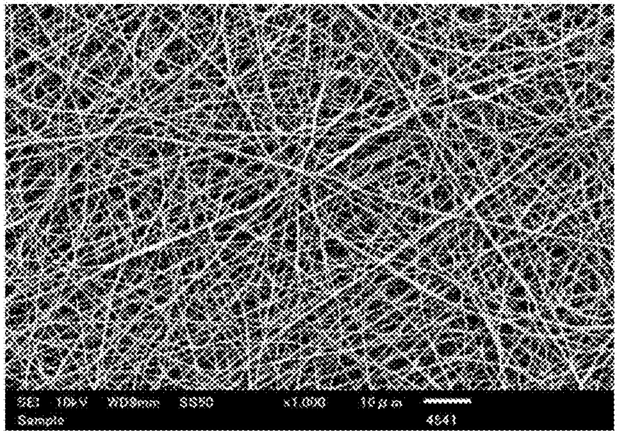
FIG. 21 is an SEM photograph (magnification of 1,000 times) of the surface of the fiber multilayer structure obtained in Comparative Example 3.

Polyethylene oxide (0.5 g, Mw=500000) as a fiber-forming agent (G) and water (10.0 g) were added to the PUD1 (2.00 g) obtained in Comparative synthesis Example 1, and stirring was performed at 50 to 60° C. for 24 hours to provide a uniform milky white spinning solution. Using the electrospinning apparatus (NEU nanofiber electrospinning unit, manufactured by KATO TECH CO., LTD.) shown in FIG. 1, the spinning solution was discharged to the collecting substrate 4 for 30 minutes under the conditions of spinning environment temperature of 24° C., spinning environment humidity of 50% RH, inner diameter of the nozzle 1 of the spinning portion of 0.4 mm, voltage of 20 kV, and distance from the nozzle 1 of the spinning portion to the collecting substrate 4 of 15 cm. The obtained fibers had an average fiber diameter of 430 nm (0.43 μm). A scanning electron micrograph of the obtained fiber and the surface of the fiber multilayer structure is shown in FIG. 21.

Comparative Example 4: Preparation of Spinning Solution and Fiberization for PUD1

Figure 22:
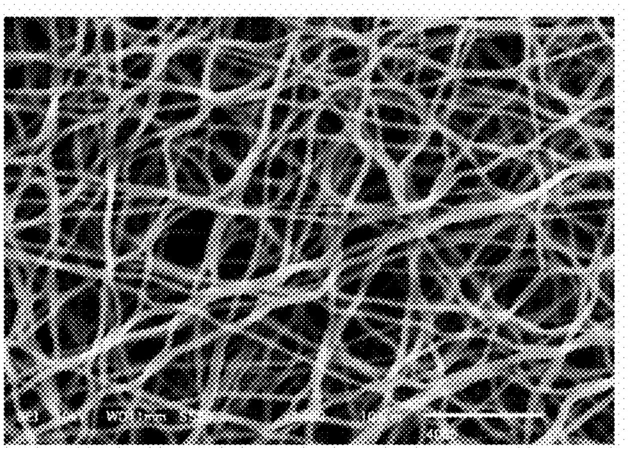
FIG. 22 is an SEM photograph (magnification of 2,500 times) of the surface of the fiber multilayer structure obtained in Comparative Example 4.

The PUD1 (100 g) obtained in Comparative Synthesis Example 1 and 15 wt % of polyvinyl alcohol aqueous solution (100 g) as a fiber-forming agent (G) were added, and stirring was performed at 22° C. for 24 hours to provide a uniform milky white spinning solution. Using an electrospinning apparatus (Nanospider (trade mark) NS Lab, manufactured by Elmarco Ltd.) shown in FIG. 2, the spinning solution was spun into the collecting substrate 14 under the conditions of spinning environment temperature of 20° C., spinning environment humidity of 30% RH, voltage of 40 to 50 kV, distance from the wire 11 of the spinning portion to the collecting substrate of 17 cm, reciprocating speed (carriage speed) of the immersion portion 16 of 50 to 100 mm/s, and moving speed of the collecting substrate 14 of 2 to 5 mm/s. The obtained fibers had an average fiber diameter of 590 nm (0.59 μm). A scanning electron micrograph of the obtained fiber and the surface of the fiber multilayer structure is shown in FIG. 22.

Examples 19 to 21: Addition of Crosslinking Agent

The SiPUD1 (100 g) obtained in Synthesis Example 1 and 15 wt % of polyvinyl alcohol aqueous solution (50 g) as a fiber-forming agent (G) were added, and stirring was performed at 22° C. for 24 hours to provide a uniform milky white spinning solution. A carbodiimide-based crosslinking agent (D-505 (solid content of 40 wt %) manufactured by Dainichiseika Color & Chemicals Mfg. Co., Ltd.), an oxazoline-based crosslinking agent (D-54 (solid content of 25 wt %) manufactured by Dainichiseika Color & Chemicals Mfg. Co., Ltd.), and an isocyanate-based crosslinking agent (D-65 (solid content of 70 wt %) manufactured by Dainichiseika Color & Chemicals Mfg. Co., Ltd.) shown in Table 3 were added thereto, and stirring was further performed for 1 hour to provide a spinning solution. Then, using an electrospinning apparatus (Nanospider (trade mark) NS Lab, manufactured by Elmarco Ltd.) shown in FIG. 2, the spinning solution was spun into the collecting substrate 14 under the conditions of spinning environment temperature of 22° C., spinning environment humidity of 20% RH, voltage of 40 kV, distance from the wire 11 of the spinning portion to the collecting substrate 14 of 17 cm, reciprocating speed (carriage speed) of the immersion portion 16 of 80 mm/s, and moving speed of the collecting substrate 14 of 2 mm/s. Thereafter, a post-treatment by heating as described in Table 3 was performed to provide a fiber multilayer structure.

Comparative Examples 5 to 7: Addition of Crosslinking Agent

To the spinning solution described in Comparative Example 4 were further added crosslinking agents described in Table 3: a carbodiimide-based crosslinking agent (D-505 (solid content of 40 wt %) manufactured by Dainichiseika Color & Chemicals Mfg. Co., Ltd.), an oxazoline-based crosslinking agent (D-54 (solid content of 25 wt %) manufactured by Dainichiseika Color & Chemicals Mfg. Co., Ltd.), and an isocyanate-based crosslinking agent (D-65 (solid content of 70 wt %) manufactured by Dainichiseika Color & Chemicals Mfg. Co., Ltd.), and stirring was further performed for 1 hour to provide a spinning solution. Then, using an electrospinning apparatus (Nanospider (trade mark) NS Lab, manufactured by Elmarco Ltd.) shown in FIG. 2, the spinning solution was spun into the collecting substrate 14 under the conditions of spinning environment temperature of 22° C., spinning environment humidity of 20% RH, voltage of 40 kV, distance from the wire 11 of the spinning portion to the collecting substrate 14 of 17 cm, reciprocating speed (carriage speed) of the immersion portion 16 of 80 mm/s, and moving speed of the collecting substrate 14 of 2 mm/s. Thereafter, a post-treatment by heating as described in Table 3 was performed to provide a fiber multilayer structure.

The measurement results of the average fiber diameter, breaking strength, breaking elongation, and moisture permeability of the fiber in the obtained fiber multilayer structure are shown in Table 3. In this case, the breaking strength, breaking elongation, and moisture permeability of the fiber multilayer structure were measured as follows.

<Breaking Strength and Breaking Elongation>

Figure 23:
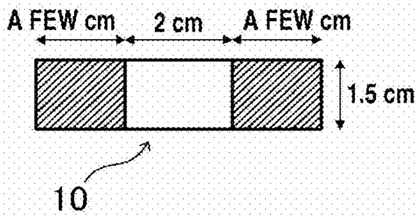
FIG. 23 is a view showing a configuration of a sample for measuring breaking strength and breaking elongation.

(i) The obtained fiber multilayer structure was punched into a dumbbell-shaped test piece shape shown in FIG. 23, and both end portions (hatched portions in FIG. 23) of the punched test piece were reinforced with cellophane tape to provide a sample 10 for measuring breaking strength and breaking elongation.

(ii) The sample 10 was subjected to a tensile test at a tensile speed of 200 mm/min by using AGS-J manufactured by Shimadzu Corporation, the stress at which the sample 10 was cut was divided by the sample cross-sectional area to provide the breaking strength, and the elongation ratio of the sample when the sample was cut was defined as the breaking elongation.

<Measurement of Moisture Permeability>

The moisture permeability of the resulting fiber multilayer structure was measured in accordance with JIS L1099A-1 method and JIS L1099 B-1 method.

Figure 24:
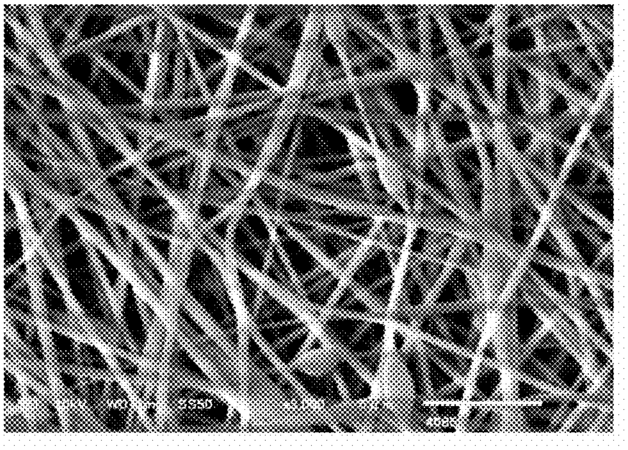
FIG. 24 is an SEM photograph (magnification of 5,000 times) of the surface of the fiber multilayer structure obtained in Example 19.
Figure 25:
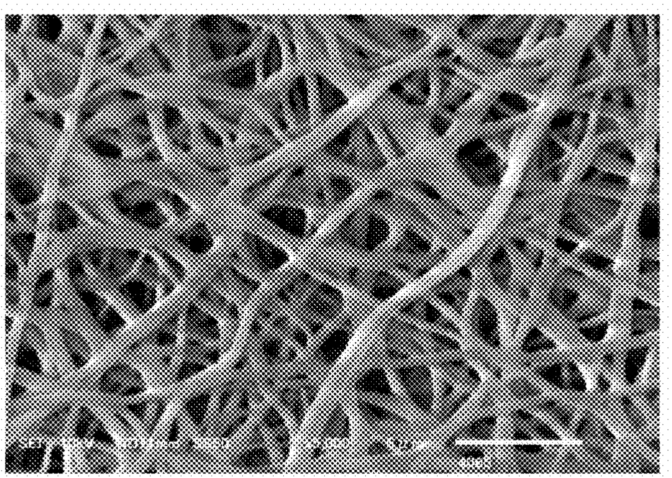
FIG. 25 is an SEM photograph (magnification of 5,000 times) of the surface of the fiber multilayer structure obtained in Example 20.
Figure 26:
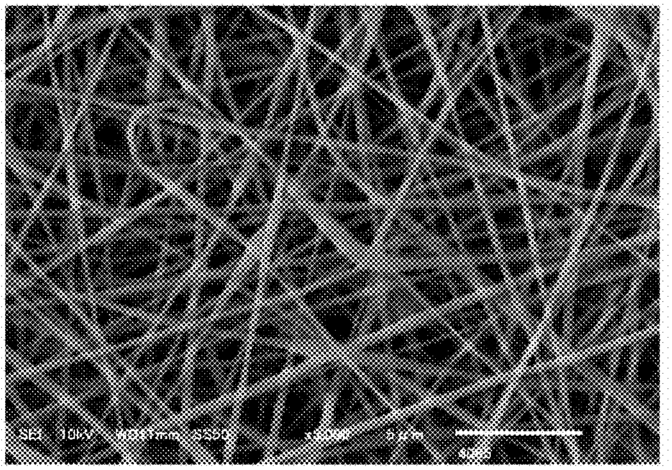
FIG. 26 is an SEM photograph (magnification of 5,000 times) of the surface of the fiber multilayer structure obtained in Example 21.
Figure 27:
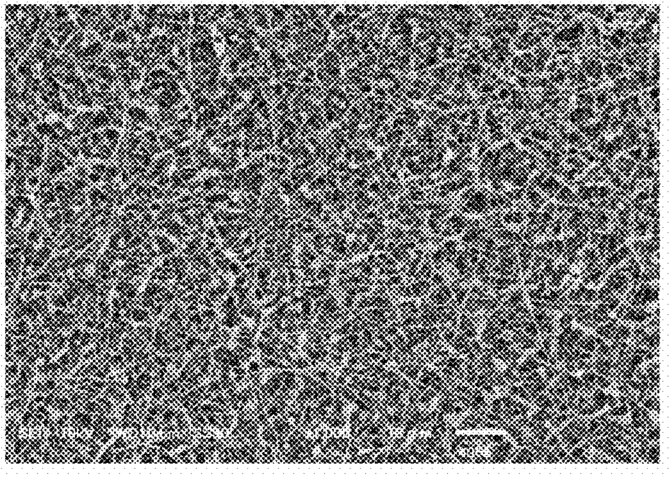
FIG. 27 is an SEM photograph (magnification of 1,000 times) of the surface of the fiber multilayer structure obtained in Comparative Example 5.
Figure 28:
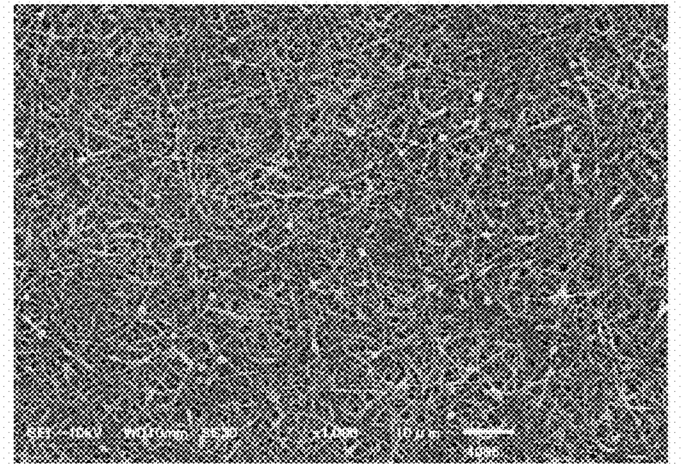
FIG. 28 is an SEM photograph (magnification of 1,000 times) of the surface of the fiber multilayer structure obtained in Comparative Example 6.
Figure 29:
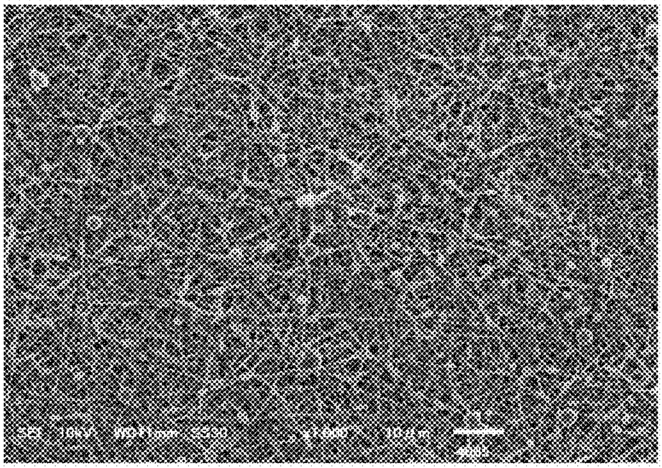
FIG. 29 is an SEM photograph (magnification of 1,000 times) of the surface of the fiber multilayer structure obtained in Comparative Example 7.

In addition, scanning electron micrographs of the obtained surfaces of the respective fiber multilayer structures are shown in FIGS. 24 to 26 for Examples 19 to 21 and FIGS. 27 to 29 for Comparative Examples 5 to 7.

The results are shown in Table 4. The fiber multilayer structure with the aqueous dispersion SiPUD1 had a larger water contact angle and exhibited water repellency as compared with the fiber multilayer structure with the aqueous dispersion PUD1. In addition, the addition of the crosslinking agent (E) further improved the water repellency.

TABLE 4

| | Example 11 | Example 19 | Example 20 | Example 21 |
|---|---|---|---|---|
| Water contact angle (°) | 96 | 126 | 130 | 133 |
| | Comparative Example 4 | Comparative Example 5 | Comparative Example 6 | Comparative Example 7 |
| Water contact angle (°) | 68 | 54 | 105 | 102 |

TABLE 3

| | | | Example | | | Comparative Example | | |
|---|---|---|---|---|---|---|---|---|
| | | | 19 | 20 | 21 | 5 | 6 | 7 |
| Spinning solution composition (g) | Aqueous dispersion | SiPUD1 | 100 | 100 | 100 | | | |
| | | PUD1 | | | | 100 | 100 | 100 |
| | (G) Fiber-forming agent | 15 wt % of PVA aqueous solution | 50 | 50 | 50 | 100 | 100 | 100 |
| | (E) Crosslinking agent | Carbodiimide-based (D-505) | 7.5 | | | 7.5 | | |
| | | Oxazoline-based (D-54) | | 9.0 | | | 9.0 | |
| | | Isocyanate-based (D-65) | | | 10.0 | | | 10.0 |
| | Water | Ion exchange water (for dilution) | 0 | 0 | 10.0 | 0 | 0 | 10.0 |
| Post-fiberization treatment | Heating treatment | Heating temperature/time | 50° C./24 h | 150° C./2 min to 50° C./24 h | 50° C./48 h | 50° C./24 h | 150° C./2 min to 50° C./24 h | 50° C./48 h |
| Evaluation result | Average fiber diameter (nm) | | 354 | 467 | 281 | 230 | 280 | 370 |
| | Tensile test | Breaking strength (MPa) | 4.2 | 5.6 | 5.4 | 3.5 | 4.6 | 4.1 |
| | | Breaking elongation (%) | 52 | 176 | 135 | 45 | 125 | 115 |
| | Moisture permeability | Method A-1 ($g/m^2 \cdot 24$ h) | Unmeasurable (membrane wet) | 14,540 | 12,670 | Unmeasurable (membrane wet) | 12,220 | 11,970 |
| | | Method B-1 ($g/m^2 \cdot 24$ h) | Unmeasurable (water infiltration) | 90,840 | 74,170 | Unmeasurable (water infiltration) | 93,870 | 74,320 |
| | Surface structure | | FIG. 24 | FIG. 25 | FIG. 26 | FIG. 27 | FIG. 28 | FIG. 29 |

Although fiberization was possible without any problem, in Comparative Examples 5 to 7 (FIGS. 27 to 29) with the aqueous dispersion PUD1, beads tended to be easily generated as compared with Examples 19 to 21 (FIGS. 24 to 26) with SiPUD1 that is silicone-modified polyurethane. It was assumed that silicone modification in the case of adding a crosslinking agent had an effect on spinning (bead suppressing effect).

<Water Contact Angle>

The static contact angle of pure water after 1000 ms (that is, 1 second) was measured for the fiber multilayer structures obtained in Examples 11 and 19 to 21 and Comparative Examples 4 to 7 with an automatic contact angle meter DM-501Hi (manufactured by Kyowa Interface Science Co., Ltd.).

Examples 22 and 23 and Comparative Examples 8 and 9: Water Washing Step

The fiber multilayer structures (width 20 mm×length 50 mm) obtained in Examples 11 and 20 and Comparative Examples 4 and 6 were fixed together with the collecting substrate, placed into a sample bottle, shaken at the speed of 24 hours and 100 cycles/min in 150 g of ion-exchanged water, and then drained. This was repeated for 3 cycles to perform washing, then drying was performed at 60° C. for 16 hours, and the water contact angles after 1 second and after 30 seconds were measured by the above method.

The results are shown in Table 5.

TABLE 5

| (Water washing) | Example 22 | Example 23 | Comparative Example 8 | Comparative Example 9 |
|---|---|---|---|---|
| Fiber multilayer structure | Example 11 | Example 20 | Comparative Example 4 | Comparative Example 6 |
| Water contact angle (°) (after 1 second) | 109 | 128 | 101 | 86 |
| Water contact angle (°) (after 30 seconds) | 103 | 126 | 76 | 68 |

It is considered that the excess polyvinyl alcohol on the fiber surface was removed by the water washing step. According to the results of water contact angle measurement performed after water washing, in the fiber multilayer structure (Comparative Examples 8 and 9) produced with the silicone-unmodified aqueous dispersion PUD1, the contact angle gradually decreased from the initial stage of dropwise addition (after 1 second), and water was considered to be absorbed by the fiber multilayer structure due to a change in the appearance of water droplets, and the contact angle significantly decreased after 30 seconds.

Whereas, if the aqueous dispersion SiPUD1 was used, the water contact angle unchanged with the lapse of time, that is, water repellency was maintained, indicating that the effect was due to silicone modification.

The present invention has been described with reference to the above-described embodiments, the present invention is not limited to these embodiments, can be changed within the scope that can be conceived by those skilled in the art, such as other embodiments, additions, modifications, and deletions, and any aspect is included in the scope of the present invention as long as the effects of the present invention are exerted.

INDUSTRIAL APPLICABILITY

The present invention can safely provide the fiber of a silicone-modified polyurethane resin, in consideration of the influence of an organic solvent on the human body and the environment and without risk of explosion or ignition, and the fiber of the present invention can contribute to various fields such as apparel, filters, and medical fields.

REFERENCE SIGNS LIST

1 nozzle (spinning portion)
2, 12 spinning solution
3 syringe (spinning solution tank)
4, 14 collecting substrate
5, 15 high voltage generator
10 sample
11 wire (spinning portion)
13 spinning solution tank
16 immersion portion

The invention claimed is:

1. A fiber, formed from a resin comprising:

a silicone-modified polyurethane resin that is a further reaction product of a reaction product of the following components (A) to (D) with a crosslinking agent (E);

a polyol (A);

a water dispersant (B);

an active hydrogen group-containing organopolysiloxane (C) of the following formula (1); and a polyisocyanate (D); and a fiber-forming agent (G) of a water-soluble polymer, $$R^1R^2R^3SiO(SiR^2R^3O)_nSiR^1R^2R^3 \quad (1)$$

wherein $R^1$ is independently a $C_{1-10}$ monovalent hydrocarbon group having a hydroxyl group or a mercapto group, and optionally having an oxygen atom interposed in the chain, or $C_{1-10}$ monovalent hydrocarbon group having a primary amino group or a secondary amino group, $R^2$ and $R^3$ are each independently a group selected from a linear, branched or cyclic $C_{1-10}$ alkyl group or $C_{7-10}$ aralkyl group in which a part of hydrogen atoms may be substituted with a fluorine atom, a $C_{6-12}$ aryl group optionally having a substituent, and a vinyl group, and n is an integer of 1 to 200, wherein the component (E) is an oxazoline-based crosslinking agent.

2. The fiber according to claim 1, wherein an average fiber diameter of the fiber is less than 2,000 nm.

3. The fiber according to claim 1, wherein the component (B) is a compound having at least one active hydrogen group and at least one hydrophilic group in a molecule.

4. The fiber according to claim 3, wherein the hydrophilic group of the compound of the component (B) is a carboxy group, sulfonic acid group, or phosphoric acid group.

5. The fiber according to claim 3, wherein the active hydrogen group of a compound of the component (B) is a hydroxyl group, amino group, or sulfanyl (thiol) group.

6. The fiber according to claim 1, wherein the component (B) is a compound having at least one hydroxyl group and at least one carboxy group.

7. The fiber according to claim 1, wherein in the formula (1), $R^1$ is 2-hydroxyetha-1-yl group, 3-hydroxypropa-1-yl group, 3-(2-hydroxyethoxy) propa-1-yl group, or 3-aminopropa-1-yl group, and $R^2$ and $R^3$ are each methyl group, phenyl group, 3,3,3-trifluoropropyl group, or vinyl group.

8. A fiber multilayer structure comprising the fiber according to claim 1.

9. The fiber multilayer structure according to claim 8, the fiber being a nonwoven fabric.

10. The fiber according to claim 1, wherein the component (G) is polyethylene oxide, polyvinyl alcohol, sodium polyacrylate, or polyvinylpyrrolidone.

11. The fiber according to claim 1, wherein the compounding amount of the component (B) is an amount such that the acid value is 5 to 40 mgKOH/g in the mass of the silicone-modified polyurethane resin.

12. The fiber according to claim 1, wherein the further reaction product of a reaction product of components (A) to (D) with a crosslinking agent (E) is a heat reaction product of the reaction product of components (A) to (D) with component (E).

13. The fiber according to claim 1, wherein component (D) is any one of aromatic diisocyanates, aliphatic diisocyanates, cycloaliphatic diisocyanates and a polyurethane prepolymer obtained by reacting these diisocyanate compounds with a low molecular weight polyol or polyamine so that the terminal becomes an isocyanate.

* * * * *